US010812159B2

(12) United States Patent
Huang et al.

(10) Patent No.: US 10,812,159 B2
(45) Date of Patent: Oct. 20, 2020

(54) ANTENNA CALIBRATION METHOD AND APPARATUS

(71) Applicant: HUAWEI TECHNOLOGIES CO., LTD., Shenzhen, Guangdong (CN)

(72) Inventors: Jiesheng Huang, Dongguan (CN); Xiangyang Liu, Shenzhen (CN); Jian Min, Shenzhen (CN); Guichun Zhuang, Gothenburg (SE); Xitao Dai, Shenzhen (CN); Guochen Liu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/519,352

(22) Filed: Jul. 23, 2019

(65) Prior Publication Data
US 2019/0349048 A1    Nov. 14, 2019

Related U.S. Application Data

(63) Continuation of application No. PCT/CN2017/072500, filed on Jan. 24, 2017.

(51) Int. Cl.
*H04B 7/06* (2006.01)
*H04B 7/08* (2006.01)
*H04W 88/08* (2009.01)

(52) U.S. Cl.
CPC .............. *H04B 7/0613* (2013.01); *H04B 7/08* (2013.01); *H04W 88/08* (2013.01)

(58) Field of Classification Search
CPC ........ H04B 7/0613; H04B 7/08; H04B 17/12; H04B 7/04; H04W 88/08
See application file for complete search history.

(56) References Cited

U.S. PATENT DOCUMENTS

| 5,477,229 A | * | 12/1995 | Caille | H01Q 3/267 |
| | | | | 342/173 |
| 5,666,128 A | * | 9/1997 | Murray | H01Q 21/0087 |
| | | | | 343/878 |

(Continued)

FOREIGN PATENT DOCUMENTS

| CN | 101569110 A | 10/2009 |
| CN | 102195695 A | 9/2011 |

(Continued)

OTHER PUBLICATIONS

Alcatel-Lucent: BS AAS Requirements and Specification Options, 3GPP Draft; R4-115270, vol. RAN WG4, no. Zhuhai; Oct. 2011, XP050544323.

*Primary Examiner* — Jean B Corrielus
(74) *Attorney, Agent, or Firm* — Womble Bond Dickinson (US) LLP

(57) ABSTRACT

Embodiments of this application provide an antenna calibration method and apparatus. In the method, for a first antenna unit and a second antenna unit, candidate phase compensation coefficients used for antenna calibration are determined based on channel responses indicating that a first calibration signal sent by the first antenna unit is received by the first antenna unit and the second antenna unit and channel responses indicating that a second calibration signal sent by the second antenna unit is received by the first antenna unit and the second antenna unit; and a phase compensation coefficient is selected from the candidate phase compensation coefficients based on measurement on an uplink signal sent by user equipment.

20 Claims, 9 Drawing Sheets

(56) References Cited

U.S. PATENT DOCUMENTS

| | | | |
|---|---|---|---|
| 9,762,283 B2* | 9/2017 | Chen | H04B 17/12 |
| 2005/0184906 A1* | 8/2005 | Nakaya | H01Q 3/2605 |
| | | | 342/377 |
| 2006/0009162 A1* | 1/2006 | Tan | H01Q 3/267 |
| | | | 455/67.11 |
| 2008/0150514 A1 | 6/2008 | Codreanu et al. | |
| 2012/0087230 A1 | 4/2012 | Guo et al. | |
| 2012/0281744 A1* | 11/2012 | Guo | H04L 27/2657 |
| | | | 375/224 |

FOREIGN PATENT DOCUMENTS

| | | |
|---|---|---|
| CN | 102299730 A | 12/2011 |
| CN | 102315866 A | 1/2012 |
| CN | 103052888 A | 4/2013 |
| CN | 103209010 A | 7/2013 |
| CN | 103475395 A | 12/2013 |
| CN | 103594823 A | 2/2014 |
| CN | 103595665 A | 2/2014 |
| CN | 105842670 A | 8/2016 |
| WO | 2008156389 A1 | 12/2008 |
| WO | 2013123753 A1 | 8/2013 |
| WO | 2016169577 A1 | 10/2016 |

* cited by examiner

ANTENNA CALIBRATION METHOD AND APPARATUS

CROSS-REFERENCE TO RELATED APPLICATIONS

This application is a continuation of International Application No. PCT/CN2017/072500, filed on Jan. 24, 2017, the disclosure of which is hereby incorporated by reference in its entirety.

TECHNICAL FIELD

This application relates to the wireless communications field, and in particular, to an antenna calibration method and apparatus.

BACKGROUND

An antenna of a conventional communications device has an architecture such as a 1T2R (one transmit channel and two receive channels) architecture and a 2T2R (two transmit channels and two receive channels) architecture. Because the antenna of the conventional communications device has a small quantity of receive channels and a small quantity of transmit channels, and does not have capabilities of beamforming and closed-loop multiple-input multiple-output (MIMO), the antenna of the conventional communications device has no requirement on same phases of the receive channels and same phases of the transmit channels.

Each of a current multi-antenna architecture, an active antenna system (AAS) architecture, and a massive MIMO architecture has a large quantity of receive channels and a large quantity of transmit channels, and has capabilities of beamforming and closed-loop MIMO. Therefore, such an architecture requires same phases of the receive channels and same phases of the transmit channels.

SUMMARY

Embodiments of this application disclose an antenna calibration method and apparatus, to implement antenna channel calibration.

According to a first aspect, an antenna calibration method, for a base station including a first antenna unit and a second antenna unit, where phases of transmit channels of a same antenna unit are the same and phases of receive channels of the same antenna unit are the same, and a phase difference between a transmit channel and a receive channel of the first antenna unit is the same as a phase difference between a transmit channel and a receive channel of the second antenna unit; and the method includes:

sending, by the first antenna unit, a first calibration signal; and receiving, by the first antenna unit and the second antenna unit, the first calibration signal;

sending, by the second antenna unit, a second calibration signal; and receiving, by the first antenna unit and the second antenna unit, the second calibration signal;

determining, by the base station, candidate phase compensation coefficients used to calibrate the phases of the transmit channels of the first antenna unit and the second antenna unit to be the same or the phases of the receive channels of the first antenna unit and the second antenna unit to be the same, based on a first channel response indicating that the first calibration signal is received by the second antenna unit, a second channel response indicating that the first calibration signal is received by the first antenna unit, a third channel response indicating that the second calibration signal is received by the first antenna unit, and a fourth channel response indicating that the second calibration signal is received by the second antenna unit;

receiving, by the first antenna unit and the second antenna unit, an uplink signal sent by user equipment;

obtaining, by the base station, a first phase difference between the receive channels of the first antenna unit and the second antenna unit and a second phase difference between the receive channels of the first antenna unit and the second antenna unit based on the uplink signal; determining a difference between the first phase difference and the second phase difference; and determining, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same, where the first phase difference is obtained based on a phase difference obtained by using channel responses of the uplink signal on two receive channels of the first antenna unit, a distance between the two receive channels, and a distance between the first antenna unit and the second antenna unit, and the second phase difference is obtained based on the channel response of the uplink signal on the receive channel of the first antenna unit and a compensated channel response obtained after phase compensation is performed on a channel response of the uplink signal on the receive channel of the second antenna unit by using one candidate phase compensation coefficient; and compensating, by the base station, for the phases of the transmit channels and the receive channels of the first antenna unit and/or the second antenna unit based on the phase compensation coefficient.

In one embodiment, the candidate phase compensation coefficients include a first candidate phase compensation coefficient and a second candidate phase compensation coefficient, and a difference between compensated phases corresponding to the first candidate phase compensation coefficient and the second candidate phase compensation coefficient is an integer multiple of 180 degrees.

In one embodiment, the uplink signal is a sounding reference signal.

In one embodiment, the process of determining candidate phase compensation coefficients used to calibrate the phases of the transmit channels of the first antenna unit and the second antenna unit to be the same or the phases of the receive channels of the first antenna unit and the second antenna unit to be the same may include:

obtaining a third phase difference based on the first channel response and the fourth channel response;

obtaining a fourth phase difference based on the third channel response and the second channel response; and determining, based on the third phase difference and the fourth phase difference, the candidate phase compensation coefficients used to calibrate the phases of the transmit channels of the first antenna unit and the second antenna unit to be the same or the phases of the receive channels of the first antenna unit and the second antenna unit to be the same.

In one embodiment, the candidate phase compensation coefficients include the first candidate phase compensation coefficient and the second candidate phase compensation coefficient, and the second phase difference is obtained based on the channel response of the uplink signal on the receive channel of the first antenna unit and a compensated channel response obtained after phase compensation is performed on the channel response of the uplink signal on the receive channel of the second antenna unit by using the first candidate phase compensation coefficient. In this case, the process of determining, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same may include: if the difference is less than the specified threshold, selecting the first candidate phase compensation coefficient as the phase compensation coefficient used to calibrate the phases of the transmit channels of the first antenna unit and the second antenna unit to be the same or the phases of the receive channels of the first antenna unit and the second antenna unit to be the same; otherwise, selecting the second candidate phase compensation coefficient as the phase compensation coefficient used to calibrate the phases of the transmit channels of the first antenna unit and the second antenna unit to be the same or the phases of the receive channels of the first antenna unit and the second antenna unit to be the same.

In one embodiment, a process of determining the first phase difference may include: determining a phase difference between a second receive channel and a first receive channel of the first antenna unit based on a channel response of the uplink signal on the first receive channel of the first antenna unit and a channel response of the uplink signal on the second receive channel of the first antenna unit; and determining a phase difference between the uplink signal on a first receive channel of the second antenna unit and the uplink signal on the second receive channel of the first antenna unit as the first phase difference based on the phase difference between the uplink signal on the second receive channel of the first antenna unit and the uplink signal on the first receive channel of the first antenna unit, a distance between the first receive channel and the second receive channel of the first antenna unit, and a distance between the second receive channel of the first antenna unit and the first receive channel of the second antenna unit; and a process of determining the second phase difference may include: performing phase compensation on a channel response of the uplink signal on the first receive channel of the second antenna unit by using one candidate phase compensation coefficient; and determining the phase difference between the uplink signal on the first receive channel of the second antenna unit and the uplink signal on the second receive channel of the first antenna unit as the second phase difference based on a channel response obtained after the phase compensation and the channel response of the uplink signal on the second receive channel of the first antenna unit.

In one embodiment, for accuracy of phase difference calculation, before the obtaining a first phase difference between the receive channels of the first antenna unit and the second antenna unit and a second phase difference between the receive channels of the first antenna unit and the second antenna unit, the method may further include: determining, by the at least one base station, whether the uplink signal is a line-of-sight transmission signal. In this case, the obtaining a first phase difference between the receive channels of the first antenna unit and the second antenna unit and a second phase difference between the receive channels of the first antenna unit and the second antenna unit may include: if the uplink signal is a line-of-sight transmission signal, obtaining the first phase difference between the receive channels of the first antenna unit and the second antenna unit and the second phase difference between the receive channels of the first antenna unit and the second antenna unit.

In one embodiment, the first antenna unit and the second antenna unit are vertically or horizontally arranged.

According to a second aspect, an embodiment of this application provides an antenna calibration apparatus, for a base station including a first antenna unit and a second antenna unit, where phases of transmit channels of a same antenna unit are the same and phases of receive channels of the same antenna unit are the same, and a phase difference between a transmit channel and a receive channel of the first antenna unit is the same as a phase difference between a transmit channel and a receive channel of the second antenna unit; and the apparatus includes:

a candidate phase compensation coefficient determining module, configured to determine candidate phase compensation coefficients used to calibrate the phases of the transmit channels of the first antenna unit and the second antenna unit to be the same or the phases of the receive channels of the first antenna unit and the second antenna unit to be the same, based on a first channel response indicating that a first calibration signal sent by the first antenna unit is received by the second antenna unit, a second channel response indicating that the first calibration signal is received by the first antenna unit, a third channel response indicating that a second calibration signal sent by the second antenna unit is received by the first antenna unit, and a fourth channel response indicating that the second calibration signal is received by the second antenna unit;

a candidate phase compensation coefficient selection module, configured to: obtain a first phase difference between the receive channels of the first antenna unit and the second antenna unit and a second phase difference between the receive channels of the first antenna unit and the second antenna unit based on an uplink signal that is sent by user equipment and that is received by the first antenna unit and the second antenna unit; determine a difference between the first phase difference and the second phase difference; and determine, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same, where the first phase difference is obtained based on a phase difference obtained by using channel responses of the uplink signal on two receive channels of the first antenna unit, a distance between the two receive channels, and a distance between the first antenna unit and the second antenna unit, and the second phase difference is obtained based on the channel response of the uplink signal on the receive channel of the first antenna unit and a compensated channel response obtained after phase compensation is performed on a channel response of the uplink signal on the receive channel of the second antenna unit by using one candidate phase compensation coefficient; and a phase compensation module, configured to compensate for the phases of the transmit channels and the receive channels of the first antenna unit and/or the second antenna unit based on the phase compensation coefficient.

In one embodiment, the candidate phase compensation coefficient selection module is further configured to:

obtain a third phase difference based on the first channel response and the fourth channel response;

obtain a fourth phase difference based on the third channel response and the second channel response; and determine, based on the third phase difference and the fourth phase difference, the candidate phase compensation coefficients used to calibrate the phases of the transmit channels of the first antenna unit and the second antenna unit to be the same or the phases of the receive channels of the first antenna unit and the second antenna unit to be the same.

In one embodiment, the candidate phase compensation coefficients include a first candidate phase compensation coefficient and a second candidate phase compensation coefficient, and the second phase difference is obtained based on the channel response of the uplink signal on the receive channel of the first antenna unit and a compensated channel response obtained after phase compensation is performed on the channel response of the uplink signal on the receive channel of the second antenna unit by using the first candidate phase compensation coefficient; and the candidate phase compensation coefficient selection module is further configured to: if the difference is less than the specified threshold, select the first candidate phase compensation coefficient as the phase compensation coefficient used to calibrate the phases of the transmit channels of the first antenna unit and the second antenna unit to be the same or the phases of the receive channels of the first antenna unit and the second antenna unit to be the same; otherwise, select the second candidate phase compensation coefficient as the phase compensation coefficient used to calibrate the phases of the transmit channels of the first antenna unit and the second antenna unit to be the same or the phases of the receive channels of the first antenna unit and the second antenna unit to be the same.

In one embodiment, the candidate phase compensation coefficient selection module is further configured to:

determine a phase difference between a second receive channel and a first receive channel of the first antenna unit based on a channel response of the uplink signal on the first receive channel of the first antenna unit and a channel response of the uplink signal on the second receive channel of the first antenna unit; and determine a phase difference between the uplink signal on a first receive channel of the second antenna unit and the uplink signal on the second receive channel of the first antenna unit as the first phase difference based on the phase difference between the uplink signal on the second receive channel of the first antenna unit and the uplink signal on the first receive channel of the first antenna unit, a distance between the first receive channel and the second receive channel of the first antenna unit, and a distance between the second receive channel of the first antenna unit and the first receive channel of the second antenna unit; and perform phase compensation on a channel response of the uplink signal on the first receive channel of the second antenna unit by using one candidate phase compensation coefficient; and determine the phase difference between the uplink signal on the first receive channel of the second antenna unit and the uplink signal on the second receive channel of the first antenna unit as the second phase difference based on a channel response obtained after the phase compensation and the channel response of the uplink signal on the second receive channel of the first antenna unit.

In one embodiment, the candidate phase compensation coefficient selection module is further configured to: before obtaining the first phase difference between the receive channels of the first antenna unit and the second antenna unit and the second phase difference between the receive channels of the first antenna unit and the second antenna unit, determine whether the uplink signal is a line-of-sight transmission signal; and if the uplink signal is a line-of-sight transmission signal, obtain the first phase difference between the receive channels of the first antenna unit and the second antenna unit and the second phase difference between the receive channels of the first antenna unit and the second antenna unit.

In one embodiment, the candidate phase compensation coefficients include the first candidate phase compensation coefficient and the second candidate phase compensation coefficient, and a difference between compensated phases corresponding to the first candidate phase compensation coefficient and the second candidate phase compensation coefficient is an integer multiple of 180 degrees.

In one embodiment, the uplink signal is a sounding reference signal.

In one embodiment, the first antenna unit and the second antenna unit are vertically or horizontally arranged.

According to a third aspect, an embodiment of this application provides one or more computer-readable media, the readable medium stores an instruction, and when the instruction is executed by one or more processors, an apparatus is enabled to perform the method according to any one of the foregoing embodiments.

According to a fourth aspect, an embodiment of this application further provides an apparatus, including one or more processors and one or more computer-readable media, the readable medium stores an instruction, and when the instruction is executed by the one or more processors, the apparatus is enabled to perform the method according to any one of the foregoing embodiments.

According to a fifth aspect, an embodiment of this application provides a base station, including a first transceiver, a second transceiver, and a processor, where the first transceiver is configured to: send a first calibration signal, receive the first calibration signal and a second calibration signal sent by the second transceiver, and receive an uplink signal sent by user equipment;

the second transceiver is configured to: send the second calibration signal, receive the second calibration signal and the first calibration signal sent by the first transceiver, and receive the uplink signal sent by the user equipment; and the processor is configured to: determine candidate phase compensation coefficients used to calibrate phases of transmit channels of the first transceiver and the second transceiver to be the same or phases of receive channels of the first transceiver and the second transceiver to be the same, based on a first channel response indicating that the first calibration signal is received by the second transceiver, a second channel response indicating that the first calibration signal is received by the first transceiver, a third channel response indicating that the second calibration signal is received by the first transceiver, and a fourth channel response indicating that the second calibration signal is received by the second transceiver; obtain a first phase difference between the receive channels of the first transceiver and the second transceiver and a second phase difference between the receive channels of the first transceiver and the second transceiver based on the uplink signal; determine a difference between the first phase difference and the second phase difference; and determine, in the candidate phase compensation coefficients based on a comparison result between the difference and a specified threshold, a phase compensation coefficient used to calibrate the phases of the transmit channels of the first transceiver and the second transceiver to be the same or the phases of the receive channels of the first transceiver and the second transceiver to be the same, where the first phase difference is obtained based on a phase difference obtained by using channel responses of the uplink signal on two receive channels of the first transceiver, a distance between the two receive channels, and a distance between the first transceiver and the second transceiver, and the second phase difference is obtained based on the channel response of the uplink signal on the receive channel of the first antenna unit and a compensated channel response obtained after phase compensation is performed on a channel response of the uplink signal on the receive channel of the second antenna unit by using one candidate phase compensation coefficient; and compensate for the phases of the transmit channels and the receive channels of the first transceiver and/or the second transceiver based on the phase compensation coefficient.

In one embodiment, the processor is further configured to: obtain a third phase difference based on the first channel response and the fourth channel response; obtain a fourth phase difference based on the third channel response and the second channel response; and determine, based on the third phase difference and the fourth phase difference, the candidate phase compensation coefficients used to calibrate the phases of the transmit channels of the first transceiver and the second transceiver to be the same or the phases of the receive channels of the first transceiver and the second transceiver to be the same.

In one embodiment, the candidate phase compensation coefficients include a first candidate phase compensation coefficient and a second candidate phase compensation coefficient, and the second phase difference is obtained based on the channel response of the uplink signal on the receive channel of the first transceiver and a compensated channel response obtained after phase compensation is performed on the channel response of the uplink signal on the receive channel of the second transceiver by using the first candidate phase compensation coefficient. The processor is further configured to: if the difference is less than the specified threshold, select the first candidate phase compensation coefficient as the phase compensation coefficient used to calibrate the phases of the transmit channels of the first transceiver and the second transceiver to be the same or the phases of the receive channels of the first transceiver and the second transceiver to be the same; otherwise, select the second candidate phase compensation coefficient as the phase compensation coefficient used to calibrate the phases of the transmit channels of the first transceiver and the second transceiver to be the same or the phases of the receive channels of the first transceiver and the second transceiver to be the same.

In one embodiment, a process of determining the first phase difference by the processor includes: determining a phase difference between a second receive channel and a first receive channel of the first transceiver based on a channel response of the uplink signal on the first receive channel of the first transceiver and a channel response of the uplink signal on the second receive channel of the first transceiver; and determining a phase difference between the uplink signal on a first receive channel of the second transceiver and the uplink signal on the second receive channel of the first transceiver as the first phase difference based on the phase difference between the uplink signal on the second receive channel of the first transceiver and the uplink signal on the first receive channel of the first transceiver, a distance between the first receive channel and the second receive channel of the first transceiver, and a distance between the second receive channel of the first transceiver and the first receive channel of the second transceiver.

In one embodiment, a process of determining the second phase difference by the processor includes: performing phase compensation on a channel response of the uplink signal on the first receive channel of the second transceiver by using one candidate phase compensation coefficient; and determining the phase difference between the uplink signal on the first receive channel of the second transceiver and the uplink signal on the second receive channel of the first transceiver as the second phase difference based on a channel response obtained after the phase compensation and the channel response of the uplink signal on the second receive channel of the first transceiver.

In one embodiment, the processor is further configured to: before obtaining the first phase difference between the receive channels of the first transceiver and the second transceiver and the second phase difference between the receive channels of the first transceiver and the second transceiver, determine whether the uplink signal is a line-of-sight transmission signal; and if the uplink signal is a line-of-sight transmission signal, obtain the first phase difference between the receive channels of the first transceiver and the second transceiver and the second phase difference between the receive channels of the first transceiver and the second transceiver.

In one embodiment, the candidate phase compensation coefficients include the first candidate phase compensation coefficient and the second candidate phase compensation coefficient, and a difference between compensated phases corresponding to the first candidate phase compensation coefficient and the second candidate phase compensation coefficient is an integer multiple of 180 degrees.

In one embodiment, the uplink signal is a sounding reference signal.

In one embodiment, the first transceiver and the second transceiver are vertically or horizontally arranged.

According to a sixth aspect, an embodiment of this application provides a computer-readable storage medium, the computer-readable storage medium stores an instruction, and when the instruction is run on a computer, the computer is enabled to perform the method according to the foregoing aspects.

In the foregoing embodiments of this application, when the phases of the transmit channels of the same antenna unit are the same and the phases of the receive channels of the same antenna unit are the same, and the phase difference between the transmit channel and the receive channel of the first antenna unit is the same as the phase difference between the transmit channel and the receive channel of the second antenna unit, the first antenna unit and the second antenna unit send the calibration signals, the calibration signals are respectively received by the first antenna unit and the second antenna unit, the corresponding channel responses are obtained, and the candidate phase compensation coefficients are determined based on the channel responses. In a process of selecting the phase compensation coefficient from a candidate phase compensation system, the channel responses are obtained based on the uplink signal sent by the user equipment, the first phase difference between the receive channels of the first antenna unit and the second antenna unit is determined by using the channel responses, and then the second phase difference between the receive channels of the first antenna unit and the second antenna unit is obtained through calculation by using the channel response of the uplink signal in the first antenna unit and the channel response obtained after compensation is performed on the channel response of the uplink signal in the second antenna unit by using one candidate phase compensation coefficient, to authenticate properness of the used candidate phase compensation coefficient based on the difference between the first phase difference and the second first phase difference, and finally obtain the proper phase compensation coefficient. The foregoing process does not need to be subject to a constraint of a hardware cable.

DESCRIPTION OF EMBODIMENTS

Figure 1A:
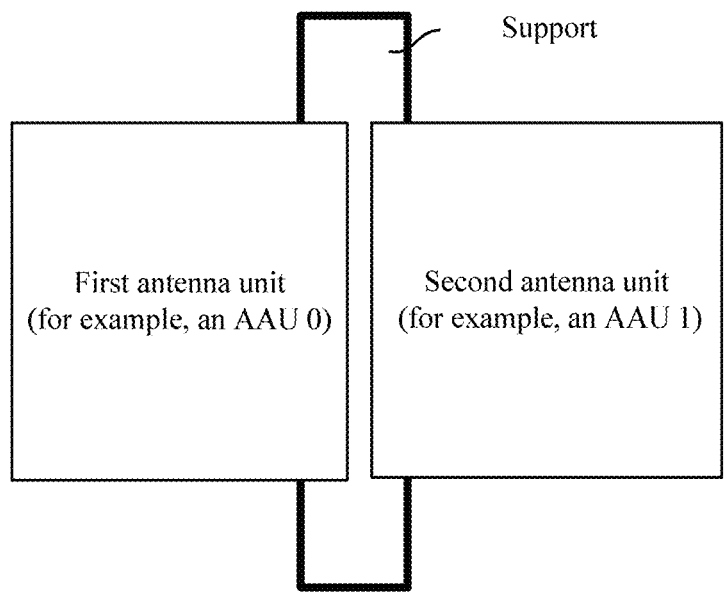
FIG. 1a and FIG. 1b are each a schematic architectural diagram of arrangement of antenna units according to an embodiment of this application.
Figure 1B:
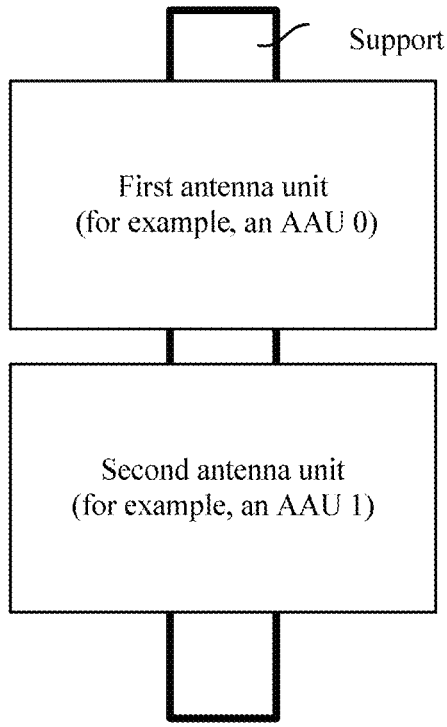

An antenna integrates a radio frequency unit and an antenna unit, and includes a plurality of transceiver modules and a plurality of antenna array elements. An antenna may have an architecture in which a plurality of antenna units are arranged, and one antenna unit integrates a transceiver module and an antenna array element. For example, two or more remote radio units (RRUs) and an antenna array element may be integrated into one antenna unit, and the antenna unit may be referred to as an active antenna unit (AAU). FIG. 1a shows an example of an active antenna architecture in which two antenna units (for example, an AAU 0 and an AAU 1) are horizontally arranged, and FIG. 1b shows an example of an active antenna architecture in which two antenna units (for example, an AAU 0 and an AAU 1) are vertically arranged.

Figure 2:
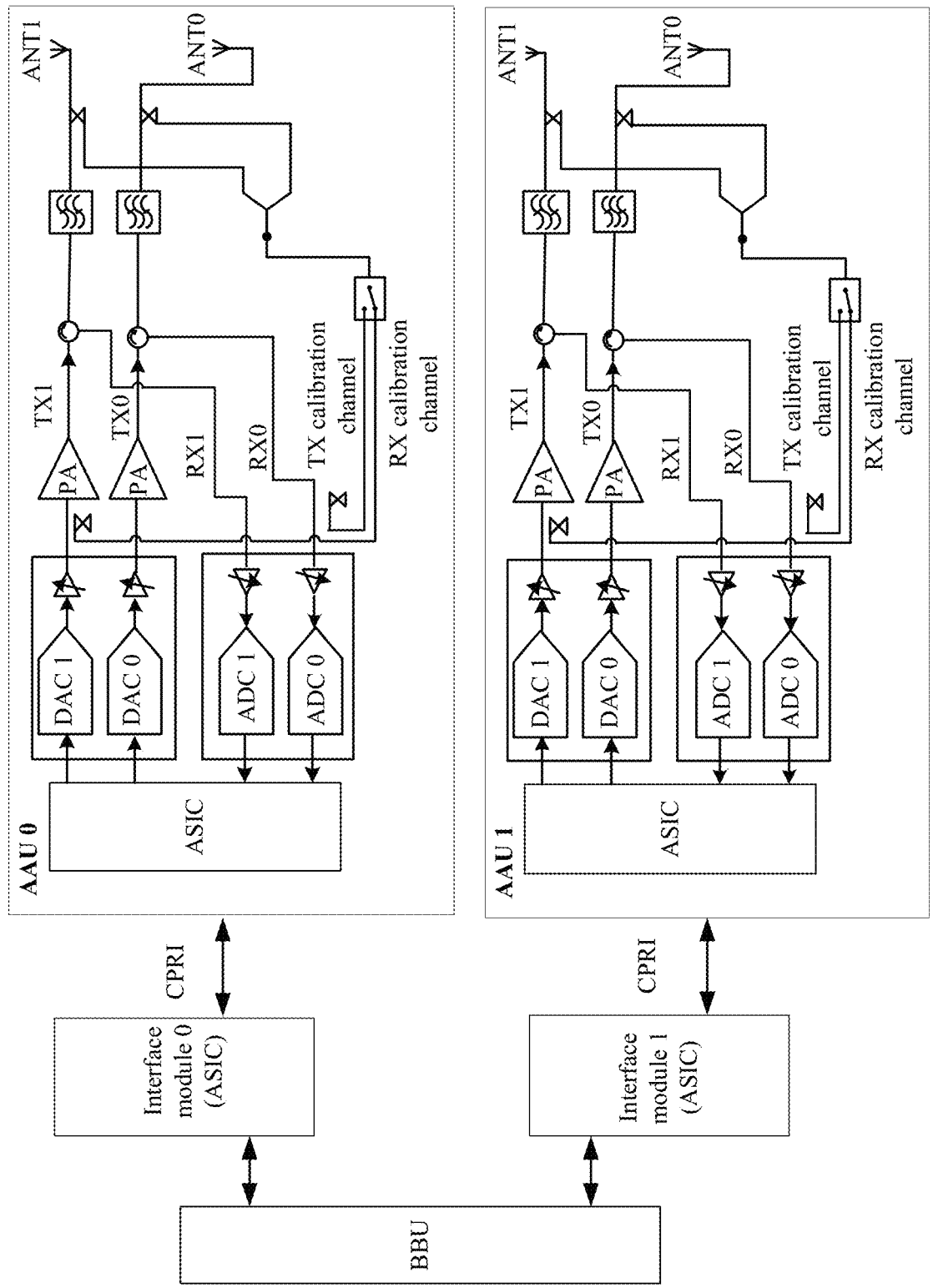
FIG. 2 is a schematic diagram of a circuit structure of a base station including two vertically arranged AAUs according to an embodiment of this application.

FIG. 2 is an example of a schematic diagram of a circuit structure inside of a base station including two vertically arranged AAUs (shown as an AAU 0 and an AAU 1 in the figure). The circuit structure is merely an example to illustrate a principle. As shown in the figure, the AAU 0 is connected to a baseband unit (BBU) by using an interface module 0. An application-specific integrated circuit (ASIC) may be used in the interface module 0. A connection manner between the AAU 0 and the interface module 0 complies with the Common Public Radio Interface (CPRI) protocol. The AAU 0 includes two transmit channels (a TX0 and a TX1 in the figure) and two receive channels (an RX0 and an RX1 in the figure), and components in the transmit channel mainly include a digital to analog converter (DAC), a power amplifier (PA), a band-pass filter, and the like. Components in the receive channel mainly include an analog to digital converter (ADC), a band-pass filter, and the like. A transmit channel and a receive channel may share one antenna array element. The AAU 0 may further include calibration channels (shown as a TX calibration channel and an RX calibration channel in the figure), and the calibration channels are coupled to the antenna array element by using a coupled circuit. A structure of the AAU 1 is similar to a structure of the AAU 0.

In one embodiment, in the foregoing architecture, different antenna units (for example, AAUs) may be connected to a same BBU. In another example, different antenna units may alternatively be connected to different BBUs, and the different BBU may transmit data or a signaling message with each other.

Figure 3:
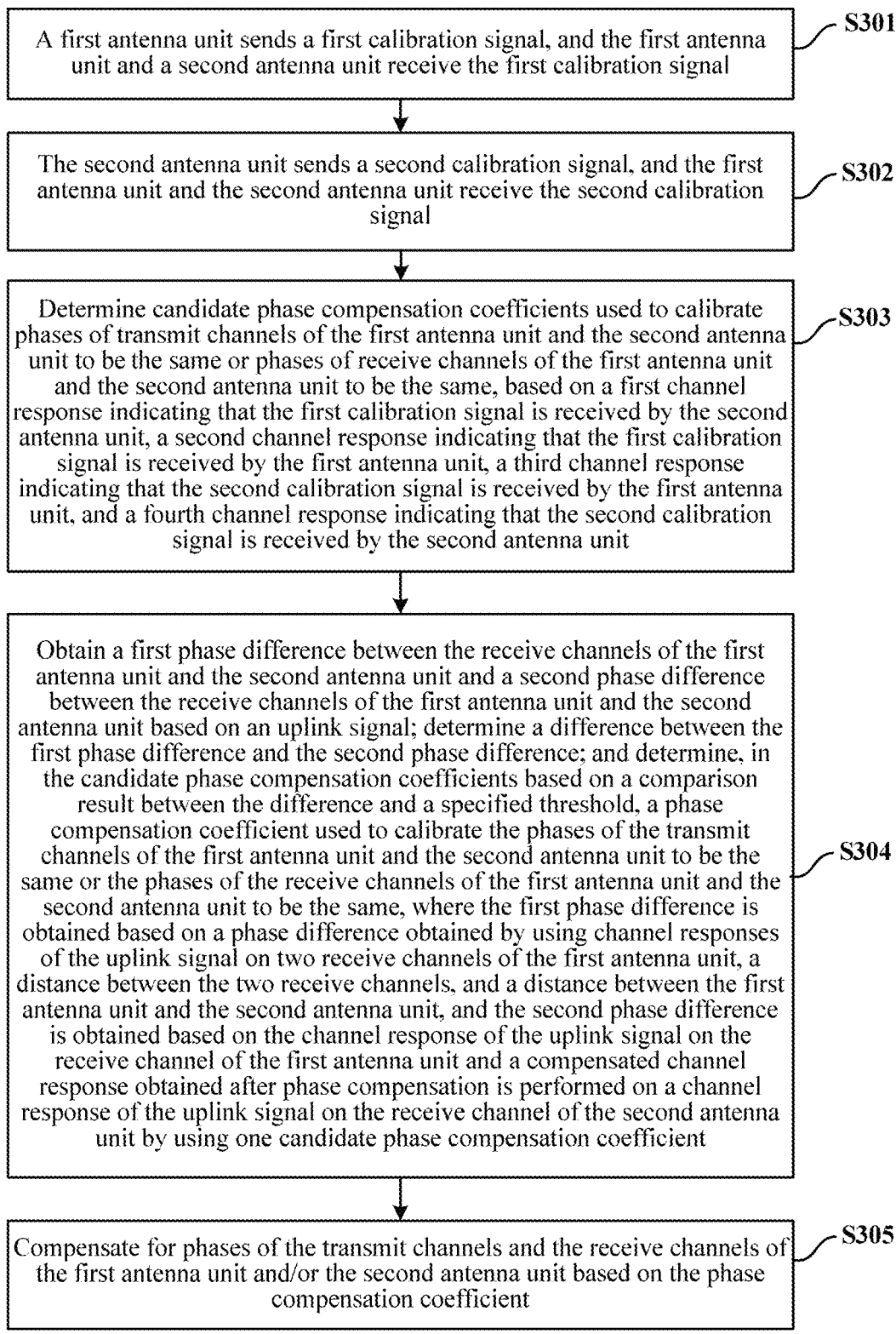
FIG. 3 is a schematic flowchart of antenna calibration according to an embodiment of this application.

FIG. 3 is an example of a schematic flowchart of antenna calibration according to an embodiment of this application. This procedure may be applied to the active antenna architecture shown in FIG. 1a or FIG. 1b or the base station architecture shown in FIG. 2, and may alternatively be applied to another antenna having a structure similar to the foregoing structure, for example, an antenna including a plurality of arranged antenna units in which each antenna unit provides a plurality of radio frequency channels or a base station architecture in which a plurality of antenna units are connected to two or more BBUs. The example shown in FIG. 3 is an example in which an antenna includes two antenna units, and the two antenna units are referred to as a first antenna unit and a second antenna unit.

Phases of transmit channels of a same antenna unit are the same and phases of receive channels of the same antenna unit are the same, and a phase difference between a transmit channel and a receive channel of the first antenna unit is the same as a phase difference between a transmit channel and a receive channel of the second antenna unit.

In one embodiment, to enable phases of transmit channels of a same antenna unit to be the same and phases of receive channels of the same antenna unit to be the same, in this embodiment of this application, phase calibration may be specifically performed by using an internal calibration method (calibration is performed by using a single module within the module). For example, in a same antenna unit, a calibration signal is sent from each transmit channel to a same receive channel, the transmit channels are calibrated by comparing channel responses of the calibration signals received by the receive channel from the different transmit channels, to be specific, a phase compensation coefficient of each transmit channel is determined. For another example, in a same antenna unit, a calibration signal is sent from one transmit channel to each receive channel, the receive channels are calibrated by comparing channel responses of the calibration signals received by the receive channels from the same transmit channel, to be specific, a phase compensation coefficient of each receive channel is determined.

After phase compensation is performed by using the determined phase compensation coefficient, for each antenna unit, channel responses of equivalent transmit channels obtained after all the transmit channels are calibrated are the same, to be specific, phases of all the transmit channels are aligned. For the antenna unit, channel responses of receive channels obtained after all the receive channels are calibrated are the same, to be specific, phases of all the receive channels are aligned. For example, $T_{ij}$ is used to represent a channel response of an equivalent transmit channel obtained after a transmit channel j of an AAU i is calibrated, $R_{ij}$ is used to represent a channel response of an equivalent receive channel obtained after a receive channel j of the AAU i is calibrated, and both a quantity of receive channels and a quantity of transmit channels are N (where N is an integer greater than or equal to 1). Using an architecture in which two AAUs are arranged as an example, after an AAU 0 and an AAU 1 complete calibration in S301, channel responses of all transmit channels are the same and are expressed as:

$$T_{00}=T_{01}=\ldots=T_{0(N-1)}=k_0$$

$$T_{10}=T_{11}=\ldots=T_{1(N-1)}=k_1$$

Channel responses of all receive channels are the same and are expressed as:

$$R_{00}=R_{01}=\ldots=R_{(N-1)}=k'_0$$

$$R_{10}=R_{11}=\ldots=R_{1(N-1)}=k'_1$$

In consideration of an unavoidable error in engineering, in this embodiment of this application, that the phases are the same or aligned may be understood as that the phases are the same or aligned within a phase error allowed range.

In one embodiment, to calibrate the phase difference between the transmit channel and the receive channel of the first antenna unit to be the same as the phase difference between the transmit channel and the receive channel of the second antenna unit, in this embodiment of this application, the calibration may be specifically performed by using reciprocity of distributed MIMO (Distributed MIMO, D-MIMO for short). For example, calibration signals may be sent and received between the first antenna unit and the second antenna unit, phase calibration is performed by comparing channel responses of the calibration signals, so that a ratio of channel responses on the transmit channel and the receive channel of the first antenna unit is equal to a ratio of channel responses on the transmit channel and the receive channel of the second antenna unit, to be specific, the phase difference between the transmit channel and the receive channel of the first antenna unit is equal to the phase difference between the transmit channel and the receive channel of the second antenna unit.

For example, $T_{ij}$ is used to represent a channel response of an equivalent transmit channel obtained after a transmit channel j of an AAU i is calibrated, $R_{ij}$ is used to represent a channel response of an equivalent receive channel obtained after a receive channel j of the AAU i is calibrated, and both a quantity of receive channels and a quantity of transmit channels are N (where N is an integer greater than or equal to 1). Using an architecture in which two AAUs are arranged as an example, after an AAU 0 and an AAU 1 complete the calibration in this operation:

$$\frac{T_{00}}{R_{00}}=\frac{T_{01}}{R_{01}}=\ldots=\frac{T_{0(N-1)}}{R_{0(N-1)}}=\frac{T_{10}}{R_{10}}=\frac{T_{11}}{R_{11}}=\ldots=\frac{T_{1(N-1)}}{R_{1(N-1)}}$$

Figure 4:
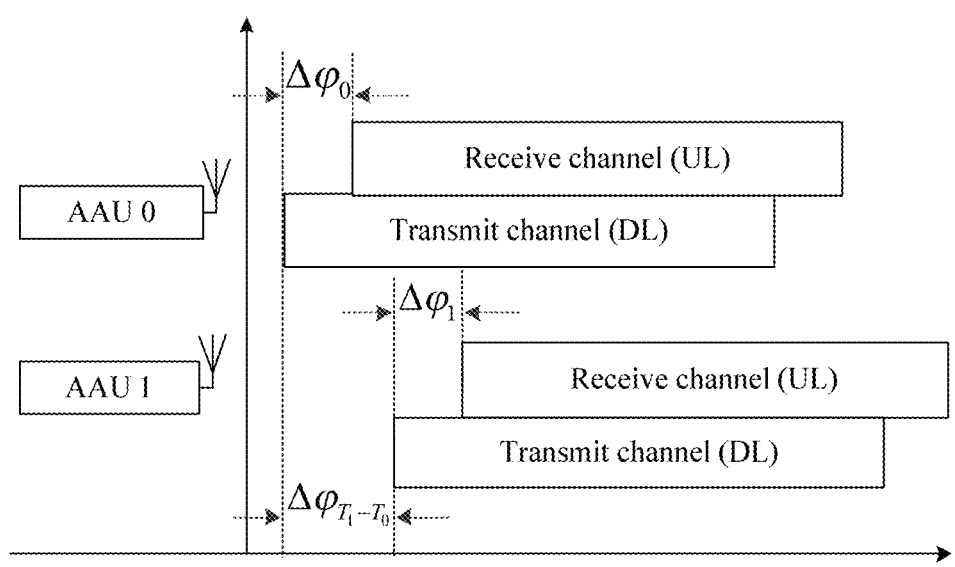
FIG. 4 is a first schematic diagram of a phase of each channel in a first antenna unit and a second antenna unit according to an embodiment of this application.

FIG. 4 is an example of a schematic diagram of a phase of each channel in a first antenna unit and a second antenna unit in a base station including the first antenna unit and the second antenna unit. As shown in the figure, phases of all transmit channels of the first antenna unit (AAU 0) are aligned, phases of all receive channels of the first antenna unit are aligned, and a phase difference between the transmit channel and the receive channel of the first antenna unit is $\Delta\phi_0$ phases of all transmit channels of the second antenna unit (AAU 1) are aligned, phases of all receive channels of the second antenna unit are aligned, and a phase difference between the transmit channel and the receive channel of the second antenna unit is $\Delta\phi_1$, where $\Delta\phi_0=\Delta\phi_1$. A phase difference $\Delta\phi_{T_1-T_0}$ further exists between receive channels of the first antenna unit and the second antenna unit; or a phase difference $\Delta\phi_{T_1-T_0}$ further exists between transmit channels of the first antenna unit and the second antenna unit. The phase difference $\Delta\phi_{T_1-T_0}$ may be eliminated by performing the following described S301 to S304, to be specific, the phases of the receive channels of the two antenna units are aligned, and the phases of the transmit channels of the two antenna units are aligned.

FIG. 3 shows an antenna calibration procedure according to an embodiment of this application.

In S301 and S302 shown in FIG. 3, the first antenna unit sends a first calibration signal, and the first antenna unit and the second antenna unit receive the first calibration signal. The second antenna unit sends a second calibration signal, and the first antenna unit and the second antenna unit receive the second calibration signal. A channel response indicating that the second antenna unit receives the first calibration signal is referred to as a first channel response, a channel response indicating that the first antenna unit receives the first calibration signal sent by the first antenna unit is referred to as a second channel response, a channel response indicating that the first antenna unit receives the second calibration signal is referred to as a third channel response, and a channel response indicating that the second antenna unit receives the second calibration signal sent by the second antenna unit is referred to as a fourth channel response.

The first calibration signal may be sent once, and both the first antenna unit and the second antenna unit receive the first calibration signal. The first calibration signal may alternatively be sent twice, the first antenna unit receives the first calibration signal sent at a time, and the second antenna unit receives the first calibration signal sent at the other time. Similarly, the second calibration signal may be sent once, and both the first antenna unit and the second antenna unit receive the second calibration signal. The second calibration signal may alternatively be sent twice, the first antenna unit receives the second calibration signal sent at a time, and the second antenna unit receives the second calibration signal sent at the other time.

In S303 shown in FIG. 3, candidate phase compensation coefficients used to calibrate the phases of the transmit channels of the first antenna unit and the second antenna unit to be the same or the phases of the receive channels of the first antenna unit and the second antenna unit to be the same are determined based on the first channel response indicating that the first calibration signal is received by the second antenna unit, the second channel response indicating that the first calibration signal is received by the first antenna unit, the third channel response indicating that the second calibration signal is received by the first antenna unit, and the fourth channel response indicating that the second calibration signal is received by the second antenna unit. S303 may be performed by a BBU connected to the first antenna unit and the second antenna unit.

The channel response may be obtained through calculation based on the following transmission model:

$$Y=X*H+N$$

Y represents a received signal (a frequency domain signal), X represents a sent signal (a frequency domain signal), H represents a channel response (or referred to as channel estimation and is a frequency domain signal), and N represents a noise and interference signal (a frequency domain signal). During specific implementation, a frequency domain channel response may be obtained through calculation by performing frequency domain transform on sent and received time domain signals.

A phase difference between the transmit channel of the first antenna unit and the transmit channel of the second antenna unit is related to a delay difference between the transmit channel of the first antenna unit and the transmit channel of the second antenna unit. Therefore, a compensated phase between the transmit channel of the first antenna unit and the transmit channel of the second antenna unit may be determined based on the delay difference between the transmit channel of the first antenna unit and the transmit channel of the second antenna unit, to determine a phase compensation value. The delay difference between the transmit channel of the first antenna unit and the transmit channel of the second antenna unit may be determined based on channel responses of the first calibration signal and the second calibration signal.

An implementation principle of S303 is described below with reference to FIG. 5a and FIG. 5b.

Figure 5A:
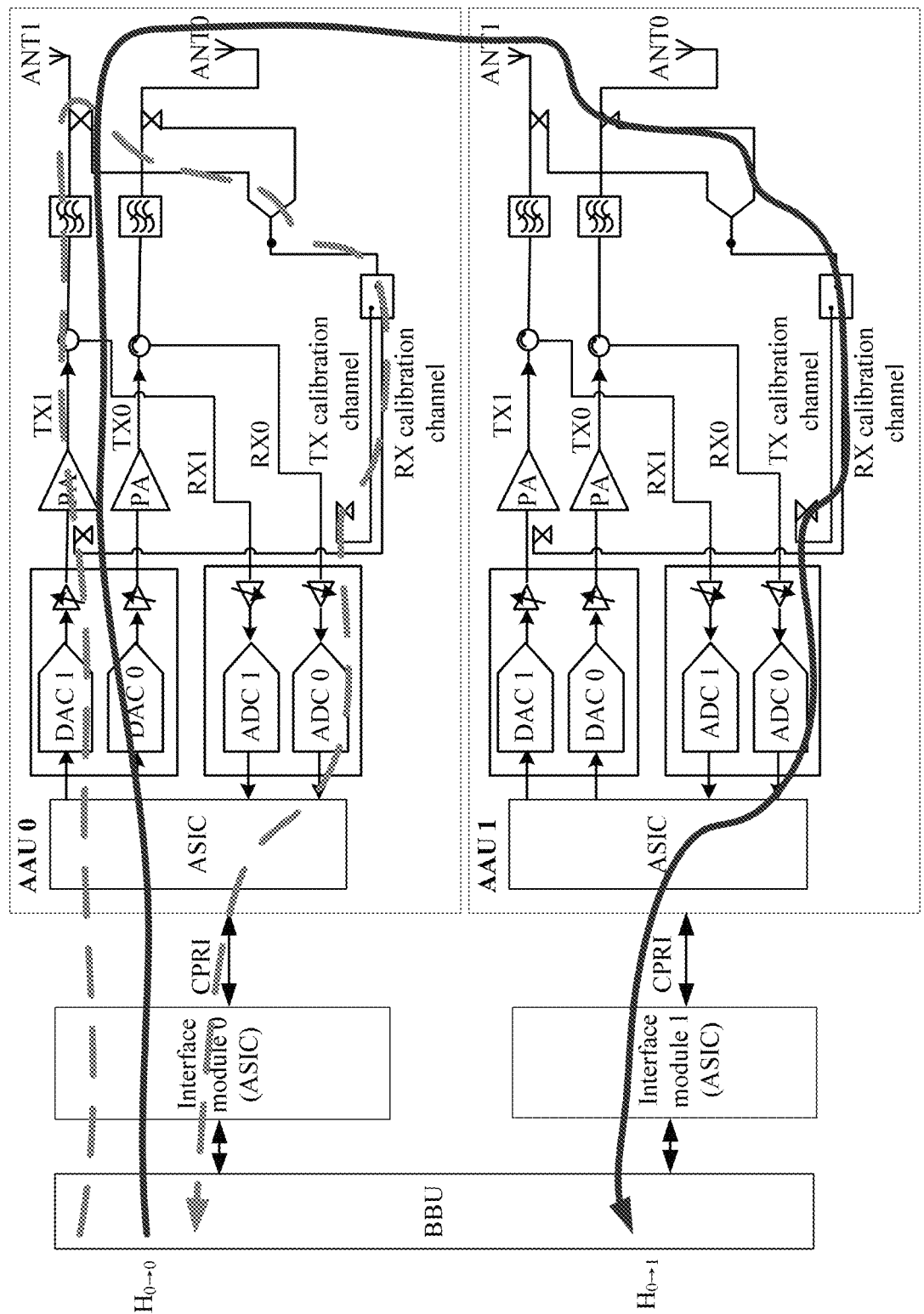
FIG. 5a and FIG. 5b are each a schematic diagram of a calibration signal transmission path according to an embodiment of this application.
Figure 5B:
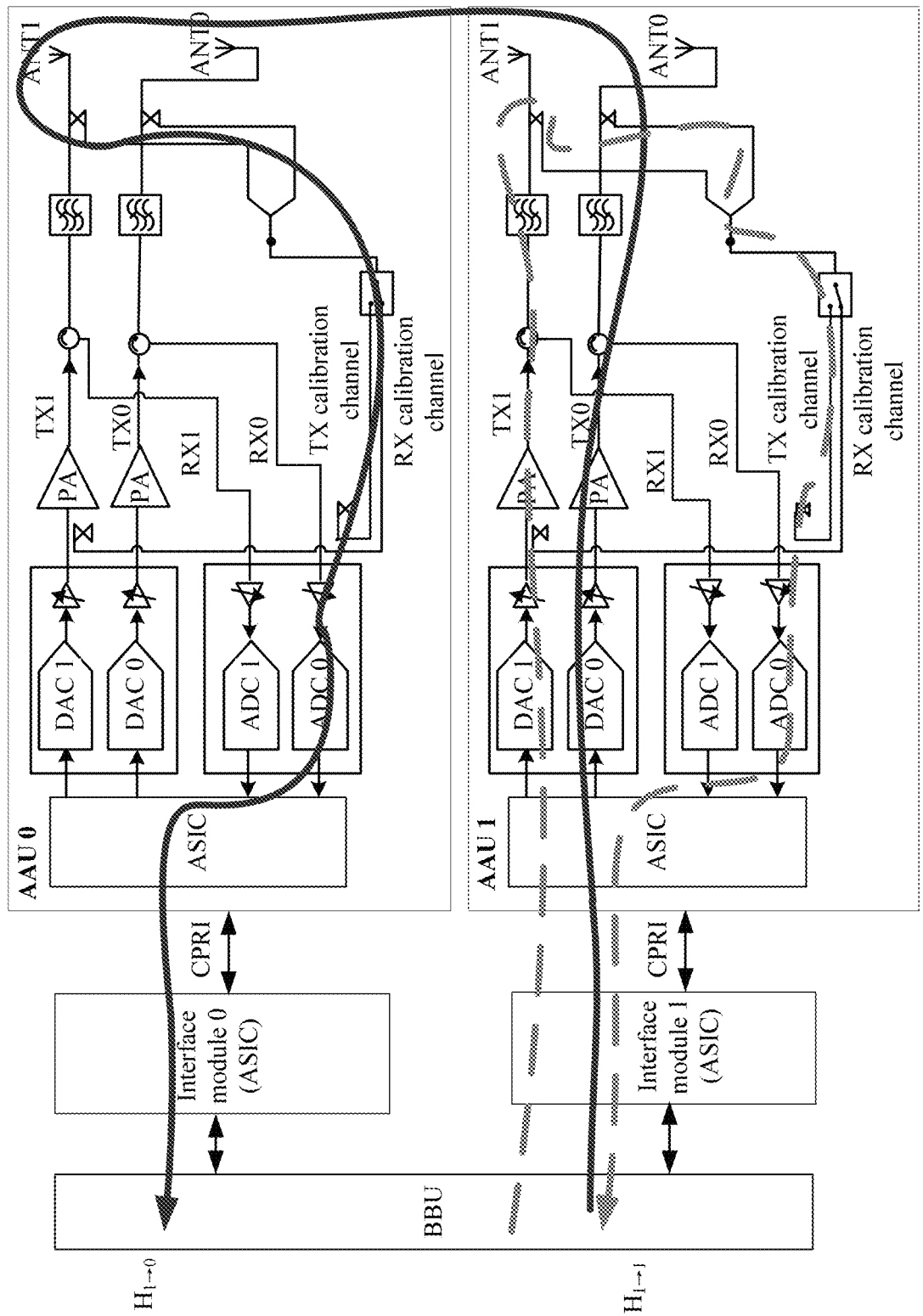

Each of FIG. 5a and FIG. 5b shows an example in which two AAUs (an AAU 0 and an AAU 1) are vertically arranged. Either of the AAU 0 and the AAU 1 includes two transmit channels (a TX0 and a TX1) and two receive channels (an RX0 and an RX1). As shown in FIG. 5a, a first calibration signal is received by a TX calibration channel of the AAU 1 through the transmit channel TX0 of the AAU 0, and a channel response of the first calibration signal is referred to as a first channel response, and is denoted as $H_{0 \to 1}$. The first calibration signal is received by a TX calibration channel of the AAU 0 through the transmit channel TX1 of the AAU 0, and a channel response of the first calibration signal is referred to as a second channel response, and is denoted as $H_{0 \to 0}$. As shown in FIG. 5b, a second calibration signal is received by a TX calibration channel of the AAU 0 through the transmit channel TX0 of the AAU 1, and a channel response of the second calibration signal is referred to as a third channel response, and is denoted as $H_{1 \to 0}$. The second calibration signal is received by a TX calibration channel of the AAU 1 through the transmit channel TX1 of the AAU 1, and a channel response of the second calibration signal is referred to as a fourth channel response, and is denoted as $H_{1 \to 1}$.

Based on a relationship between a frequency domain and a time domain, a group delay of $H_{0 \to 1}$ corresponds to $T_0 + H_{air} + t_1 + CAL_1$, a group delay of $H_{0 \to 0}$ corresponds to $T_0 + CAL_0$, a group delay of $H_{1 \to 0}$ corresponds to $T_1 + H_{air} + t_0 + CAL_0$, and a group delay of $H_{1 \to 1}$ corresponds to $T_1 + CAL_1$, where $T_0$: represents a delay that the first calibration signal passes through the transmit channel of the AAU 0;

$T_0$: represents a delay that the second calibration signal passes through the transmit channel of the AAU 1;

$H_{air}$: represents an air interface delay between the first calibration signal and the second calibration signal on an antenna array element of the AAU 1 and an antenna array element of the AAU 0 (based on spatial reciprocity, it may be considered that an air interface delay between the antenna array element of the AAU 0 and the antenna array element of the AAU 1 is the same as an air interface delay between the antenna array element of the AAU 1 and the antenna array element of the AAU 0);

$t_0$: represents a delay caused because the first calibration signal in the AAU 0 is coupled from the antenna unit to the TX calibration channel ($t_0$ can be ensured by engineering design, and $t_0$ depends on precision of a microstrip dielectric constant value, so that $t_0$ may be usually controlled within 5 picoseconds (picosecond));

$t_1$: represents a delay caused because the second calibration signal in the AAU 1 is coupled from the antenna unit to the TX calibration channel ($t_1$ can be ensured by engineering design, and $t_1$ depends on precision of a microstrip DK value, so that $t_1$ may be usually controlled within 5 picoseconds);

$CAL_0$: represents a delay that the first calibration signal passes through the TX calibration channel of the AAU 0; and $CAL_1$: represents a delay that the second calibration signal passes through the TX calibration channel of the AAU 1.

Based on the relationship between the frequency domain and the time domain, it may be obtained that:

$$\frac{H_{1 \to 0}}{H_{0 \to 0}}$$

corresponds to a difference between $(2 \times \pi \times fs \times (T_1 + H_{air} + t_0 + CAL_0))$ and $(2 \times \pi \times fs \times (T_0 + CAL_0))$, to be specific, corresponds to $(2 \times \pi \times fs \times (T_1 + H_{air} + t_0 - T_0))$;

$$\frac{H_{1 \to 0}}{H_{0 \to 0}}$$

corresponds to a difference between $(2 \times \pi \times fs \times (T_0 + H_{air} + t_1 + CAL_1))$ and $(2 \times \pi \times fs \times (T_1 + CAL_1))$, to be specific, corresponds to $(2 \times \pi \times fs \times (T_0 + H_{air} + t_1 - T_1))$, where fs represents a transmission signal frequency of each channel.

$$Y_1 = \frac{H_{1 \to 0}}{H_{0 \to 0}} \text{ and } Y_0 = \frac{H_{0 \to 1}}{H_{1 \to 1}}$$

are denoted, so that a phase compensation coefficient may be obtained based on $Y_1$ and $Y_0$. The phase compensation coefficient may satisfy the following formula:

$$\beta = \left(\frac{\frac{H_{1 \to 0}}{H_{0 \to 0}}}{\frac{H_{0 \to 1}}{H_{1 \to 1}}}\right)^* = \left(\frac{H_{1 \to 0}}{H_{0 \to 1}} \times \frac{H_{1 \to 1}}{H_{0 \to 0}}\right)^*$$

where the first channel response $H_{0 \to 1}$, the second channel response $H_{0 \to 0}$, the third channel response $H_{1 \to 0}$, and the fourth channel response $H_{1 \to 1}$ may be respectively estimated for each subcarrier; correspondingly, the first channel response may alternatively be denoted as $H_{0 \to 1}(n)$, the second channel response may alternatively be denoted as $H_{0 \to 0}(n)$, the third channel response may alternatively be denoted as $H_{1 \to 0}(n)$, and the fourth channel response may alternatively be denoted as $H_{1 \to 1}(n)$, where n represents a number of a subcarrier, n=0, 1, . . . , Sc Nu $m_{BW}$, and a quantity of subcarriers is Sc Nu $m_{BW}$−1.

A first candidate phase compensation coefficient $\beta(n)$ and a second candidate phase compensation coefficient $\beta(n)^* e^{j\pi}$ may be obtained based on the foregoing descriptions, where ( )* represents a conjugate operation. $\pi$ blur exists in the phase compensation coefficient, to be specific, a difference between compensated phases corresponding to the first candidate phase compensation coefficient and the second candidate phase compensation coefficient is an integer multiple of 180 degrees. Therefore, a phase compensation coefficient further needs to be selected from the candidate phase compensation coefficients by using S304.

In S304 shown in FIG. 3, a first phase difference between the receive channels of the first antenna unit and the second antenna unit and a second phase difference between the receive channels of the first antenna unit and the second antenna unit are obtained based on the uplink signal; a difference between the first phase difference and the second phase difference is determined; and a phase compensation coefficient used to calibrate the phases of the transmit channels of the first antenna unit and the second antenna unit to be the same or the phases of the receive channels of the first antenna unit and the second antenna unit to be the same is determined in the candidate phase compensation coefficients based on a comparison result between the difference and a specified threshold. S304 may be performed by the BBU connected to the first antenna unit and the second antenna unit.

The first phase difference is obtained based on a phase difference obtained by using channel responses of the uplink signal on the two receive channels of the first antenna unit, a distance between the two receive channels, and a distance between the first antenna unit and the second antenna unit, and the second phase difference is obtained based on the channel response of the uplink signal on the receive channel of the first antenna unit and a compensated channel response obtained after phase compensation is performed on a channel response of the uplink signal on the receive channel of the second antenna unit by using one candidate phase compensation coefficient.

The uplink signal may be an uplink reference signal, for example, a sounding reference signal (Sounding Reference Signal, SRS for short), or may be an uplink signal of another type.

Figure 6:
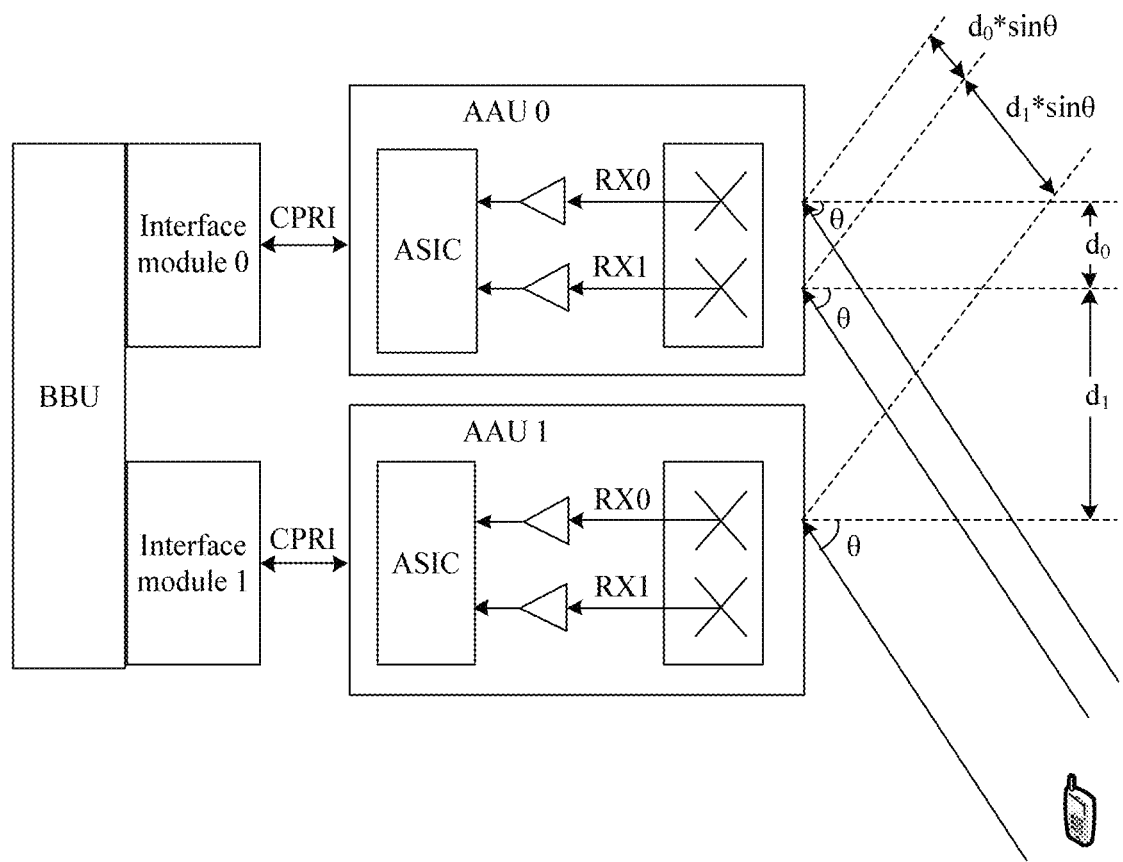
FIG. 6 is a schematic diagram of a relationship between an SRS signal phase and receive channels of an AAU 0 and an AAU 1 according to an embodiment of this application.

In FIG. 6, an example of an architecture in which two AAUs are vertically arranged is used to illustrate a principle of S304. As shown in FIG. 6, user equipment (UE) is relatively far away from the AAUs, so that angles of arrival of an SRS sent by the UE on an AAU 0 and an AAU 1 may be considered to be the same. Therefore, a phase difference between a receive channel RX1 of the AAU 0 and a receive channel RX0 of the AAU 1 may be obtained through calculation based a phase difference between a receive channel RX0 and the receive channel RX1 of the AAU 0 and a distance between the receive channels.

During specific implementation, the AAU 0 may be used as a reference antenna unit. A phase difference $\varphi_{01\text{-}00}$ between the SRS on the receive channel RX0 of the AAU 0 and the SRS on the receive channel RX1 of the AAU 0 is determined based on a channel response $H_{00}^{SRS}(n)$ of the SRS on the receive channel RX0 of the AAU 0 and a channel response $H_{00}^{SRS}(n)$ of the SRS on the receive channel RX1 of the AAU 0:

$$\varphi_{01\text{-}00} = \text{average}\left[\text{angle}\left(\frac{H_{01}^{SRS}(n)}{H_{00}^{SRS}(n)}\right)\right]$$

where average [ ] represents averaging n, and a channel response (a channel estimation result) of the SRS on a receive channel j of an AAU i is expressed as $H_{ij}^{SRS}(n)$, n=0, 1, . . . , ScNum$_{SRS}$, where n represents a number of a subcarrier, and a quantity of subcarriers corresponding to a resource block (Resource Block, RB for short) occupied by the SRS is ScNum$_{SRS}$−1.

A phase difference $\varphi_{10\text{-}01}$ between the SRS on the receive channel RX0 of the AAU 1 and the SRS on the receive channel RX1 of the AAU 0 is determined based on the phase difference $\varphi_{01\text{-}00}$, a distance $d_1$ between the receive channel RX1 of the AAU 0 and the receive channel RX0 of the AAU 1, and a distance $d_0$ between the receive channel RX0 of the AAU 0 and the receive channel RX1 of the AAU 0:

$$\varphi_{10\text{-}01} = \varphi_{01\text{-}00} \times \frac{d_1}{d_0}$$

Phase compensation is performed on a channel response $H_{10}^{SRS}(n)$ on the receive channel RX0 of the AAU 1 by using one candidate phase compensation coefficient β(n), and a phase difference, $\tilde{\varphi}_{10\text{-}01}$ between the receive channel RX0 of the AAU 1 and the receive channel RX1 of the AAU 0 is calculated based on a compensated channel response and the channel response $H_{00}^{SRS}(n)$ of the SRS on the receive channel RX1 of the AAU 0:

$$\tilde{\varphi}_{10\text{-}01}=\text{average}\{\text{angle}[\beta(n)*H_{10}^{SRS}(n)]-\text{angle}[H_{01}^{SRS}(n)]\}$$

A phase compensation coefficient is selected from candidate phase compensation coefficients based on a difference between $\tilde{\varphi}_{10\text{-}01}$ and $\varphi_{10\text{-}01}$. If the difference between and $\tilde{\varphi}_{10\text{-}01}$ is less than a specified threshold, a phase compensation coefficient β(n) used for calculating $\tilde{\varphi}_{10\text{-}01}$ is selected; otherwise, a phase compensation coefficient $\beta(n)*e^{j\pi}$ is selected. A value range of the specified threshold may be set to 0 to 90 degrees. For example, a value of the specified threshold may be set to 20 degrees. Certainly, the specified threshold may alternatively be set to another value based on a requirement (for example, a precision requirement).

In some embodiments, considering that transmission of the uplink signal (for example, an SRS) may be line-of-sight transmission (where the line-of-sight transmission refers to a propagation manner in which a wave is propagated from a transmit point to a receive point within a distance in which a transmit antenna and a receive antenna can "see" each other), or may be non-line-of-sight transmission. To improve accuracy of phase difference calculation in S304, it may be determined first whether the uplink signals received by the antenna units are line-of-sight transmission signals of the same UE. If yes, the phase difference calculation in S304 is performed; otherwise, the phase difference calculation in S304 may be performed after the line-of-sight transmission signals of the same UE are received. During specific implementation, line-of-sight transmission identification, namely, line of sight (Line of Sight, LOS for short) path identification, may be separately performed on different antenna units. If an uplink signal satisfies an LOS path determining condition, the uplink signal is an LOS path signal.

In S305 in FIG. 3, the phases of the transmit channels and the receive channels of the first antenna unit and/or the second antenna unit are compensated for based on the phase compensation coefficient. S305 may be performed by the BBU connected to the first antenna unit and the second antenna unit.

Figure 7:
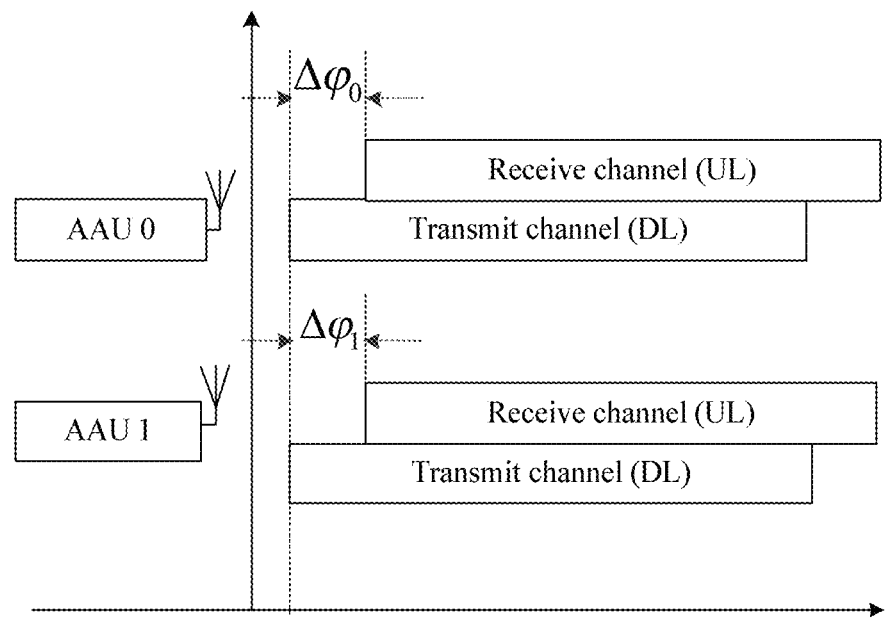
FIG. 7 is a second schematic diagram of a phase of each channel in a first antenna unit and a second antenna unit according to an embodiment of this application.

After the antenna calibration procedure provided in this embodiment of this application, phases of radio frequency channels between the first antenna unit and the second antenna unit may be shown in FIG. 7. Compared with FIG. 4 in which phases of all the transmit channels of the first antenna unit (AAU 0) are aligned, phases of all the receive channels of the first antenna unit are aligned, and a phase difference between the transmit channel and the receive channel of the first antenna unit is $\Delta\phi_0$; phases of all the transmit channels of the second antenna unit (AAU 1) are aligned, phases of all the receive channels of the second antenna unit are aligned, and a phase difference between the transmit channel and the receive channel of the second antenna unit is $\Delta\phi_1$, where $\Delta\phi_0=\Delta\phi_1$, the receive channels of the first antenna unit and the second antenna unit are aligned, and the transmit channels of the first antenna unit and the second antenna unit are aligned.

In one embodiment, in a case in which the first antenna unit and the second antenna unit are connected to two or more BBUs, this application may be still applied to the case for implementation. Data such as a received signal, a channel response, and a phase compensation coefficient between different antenna units may be obtained through data and/or signaling transmission between the BBUs. In some embodiments, the first antenna unit and the second antenna unit are horizontally arranged. For such an antenna system architecture, antenna calibration may also be performed based on a principle the same as that in the foregoing embodiments.

In some embodiments, an antenna system includes at least two antenna units arranged together. For such an antenna system, antenna calibration may also be performed in the manner described in the foregoing embodiments. For example, every two neighboring antenna units may be separately calibrated by using the antenna calibration method provided in the embodiments of this application.

It can be learned from the foregoing descriptions that, for a problem that phases of transmit and receive channels of arranged antenna units are different, in the foregoing embodiments of this application, the phases of the receive channels are enabled to be the same, and the phases of the transmit channels are enabled to be the same. In the embodiments of this application, the calibration signals are transmitted between the antenna units, a common unknown quantity is canceled through internal and external calibration, and joint calibration between modules is resolved through air interface coupling, thereby removing a constraint of a hardware cable.

Based on a same technical concept, an embodiment of this application further provides an antenna calibration apparatus. The apparatus may implement the antenna calibration procedure described in the foregoing embodiments for arranged (for example, vertically or horizontally arranged) antenna units.

Figure 8:
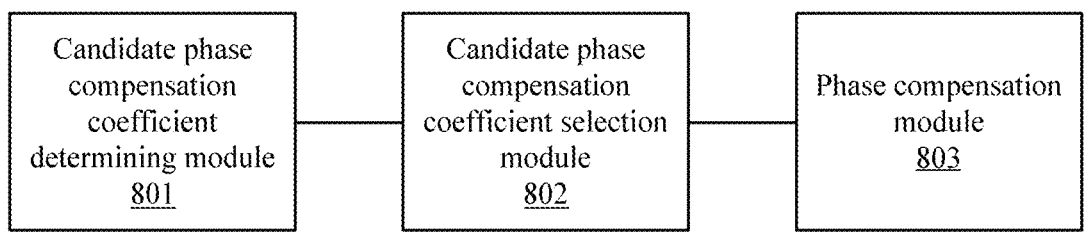
FIG. 8 is a schematic structural diagram of an antenna calibration apparatus according to an embodiment of this application.

FIG. 8 is a schematic structural diagram of an antenna calibration apparatus according to an embodiment of this application. The apparatus may be applied to at least one base station including a first antenna unit and a second antenna unit, phases of transmit channels of a same antenna unit are the same and phases of receive channels of the same antenna unit are the same, and a phase difference between a transmit channel and a receive channel of the first antenna unit is the same as a phase difference between a transmit channel and a receive channel of the second antenna unit. For example, the apparatus may be a base station or a functional module in the base station. The apparatus may include a candidate phase compensation coefficient determining module 801, a candidate phase compensation coefficient selection module 802, and a phase compensation module 803.

The candidate phase compensation coefficient determining module 801 is configured to determine candidate phase compensation coefficients used to calibrate the phases of the transmit channels of the first antenna unit and the second antenna unit to be the same or the phases of the receive channels of the first antenna unit and the second antenna unit to be the same, based on a first channel response indicating that a first calibration signal sent by the first antenna unit is received by the second antenna unit, a second channel response indicating that the first calibration signal is received by the first antenna unit, a third channel response indicating that a second calibration signal sent by the second antenna unit is received by the first antenna unit, and a fourth channel response indicating that the second calibration signal is received by the second antenna unit.

The candidate phase compensation coefficient selection module 802 is configured to: obtain a first phase difference between the receive channels of the first antenna unit and the second antenna unit and a second phase difference between the receive channels of the first antenna unit and the second antenna unit based on an uplink signal that is sent by user equipment and that is received by the first antenna unit and the second antenna unit; determine a difference between the first phase difference and the second phase difference; and determine, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same, where the first phase difference is obtained based on a phase difference obtained by using channel responses of the uplink signal on two receive channels of the first antenna unit, a distance between the two receive channels, and a distance between the first antenna unit and the second antenna unit, and the second phase difference is obtained based on the channel response of the uplink signal on the receive channel of the first antenna unit and a compensated channel response obtained after phase compensation is performed on a channel response of the uplink signal on the receive channel of the second antenna unit by using one candidate phase compensation coefficient.

The phase compensation module 803 is configured to compensate for the phases of the transmit channels and the receive channels of the first antenna unit and/or the second antenna unit based on the phase compensation coefficient.

In one embodiment, the candidate phase compensation coefficient selection module 802 may be further configured to: obtain a third phase difference based on the first channel response and the fourth channel response; obtain a fourth phase difference based on the third channel response and the second channel response; and determine, based on the third phase difference and the fourth phase difference, the candidate phase compensation coefficients used to the phases of the transmit channels of the first antenna unit and the second antenna unit to be the same or the phases of the receive channels of the first antenna unit and the second antenna unit to be the same.

In one embodiment, the candidate phase compensation coefficients include a first candidate phase compensation coefficient and a second candidate phase compensation coefficient, and the second phase difference is obtained based on the channel response of the uplink signal on the receive channel of the first antenna unit and a compensated channel response obtained after phase compensation is performed on the channel response of the uplink signal on the receive channel of the second antenna unit by using the first candidate phase compensation coefficient. Correspondingly, the candidate phase compensation coefficient selection module 802 may be further configured to: if the difference is less than the specified threshold, select the first candidate phase compensation coefficient as the phase compensation coefficient used to calibrate the phases of the transmit channels of the first antenna unit and the second antenna unit to be the same or the phases of the receive channels of the first antenna unit and the second antenna unit to be the same; otherwise, select the second candidate phase compensation coefficient as the phase compensation coefficient used to calibrate the phases of the transmit channels of the first antenna unit and the second antenna unit to be the same or the phases of the receive channels of the first antenna unit and the second antenna unit to be the same.

In one embodiment, the candidate phase compensation coefficient selection module 802 may be further configured to: determine a phase difference between a second receive channel and a first receive channel of the first antenna unit based on a channel response of the uplink signal on the first receive channel of the first antenna unit and a channel response of the uplink signal on the second receive channel of the first antenna unit; and determine a phase difference between the uplink signal on a first receive channel of the second antenna unit and the uplink signal on the second receive channel of the first antenna unit as the first phase difference based on the phase difference between the uplink signal on the second receive channel of the first antenna unit and the uplink signal on the first receive channel of the first antenna unit, a distance between the first receive channel and the second receive channel of the first antenna unit, and a distance between the second receive channel of the first antenna unit and the first receive channel of the second antenna unit; and perform phase compensation on a channel response of the uplink signal on the first receive channel of the second antenna unit by using one candidate phase compensation coefficient; and determine the phase difference between the uplink signal on the first receive channel of the second antenna unit and the uplink signal on the second receive channel of the first antenna unit as the second phase difference based on a channel response obtained after the phase compensation and the channel response of the uplink signal on the second receive channel of the first antenna unit.

In one embodiment, the candidate phase compensation coefficient selection module 802 may be further configured to: before obtaining the first phase difference between the receive channels of the first antenna unit and the second antenna unit and the second phase difference between the receive channels of the first antenna unit and the second antenna unit, determine whether the uplink signal is a line-of-sight transmission signal; and if the uplink signal is a line-of-sight transmission signal, obtain the first phase difference between the receive channels of the first antenna unit and the second antenna unit and the second phase difference between the receive channels of the first antenna unit and the second antenna unit.

In one embodiment, the candidate phase compensation coefficients include the first candidate phase compensation coefficient and the second candidate phase compensation coefficient, and a difference between compensated phases corresponding to the first candidate phase compensation coefficient and the second candidate phase compensation coefficient is an integer multiple of 180 degrees.

In one embodiment, the uplink signal is a sounding reference signal.

In one embodiment, the first antenna unit and the second antenna unit are vertically or horizontally arranged.

Based on a same technical concept, an embodiment of this application further provides one or more computer-readable media, the readable medium stores an instruction, and when the instruction is executed by one or more processors, a device is enabled to perform the procedure described in the foregoing embodiments.

Based on a same technical concept, an embodiment of this application further provides a base station, and the base station implements the procedure described in the foregoing embodiments.

Figure 9:
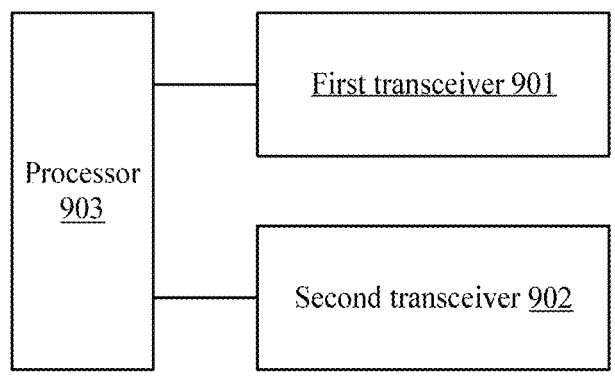
FIG. 9 is a schematic structural diagram of a base station according to an embodiment of this application.

FIG. 9 is an example of a schematic structural diagram of a base station according to an embodiment of this application. The base station may include a first transceiver 901, a second transceiver 902, and a processor 903. In one embodiment, the first transceiver 901 and the second transceiver 902 may be vertically or horizontally arranged. FIG. 9 shows only a case in which the first transceiver 901 and the second transceiver 902 are vertically arranged. In the base station:

the first transceiver 901 is configured to: send a first calibration signal, receive the first calibration signal and a second calibration signal sent by the second transceiver 902, and receive an uplink signal sent by user equipment;

the second transceiver 902 is configured to: send the second calibration signal, receive the second calibration signal and the first calibration signal sent by the first transceiver 901, and receive the uplink signal sent by the user equipment; and the processor 903 is configured to: determine candidate phase compensation coefficients used to calibrate phases of transmit channels of the first transceiver 901 and the second transceiver 902 to be the same or phases of receive channels of the first transceiver 901 and the second transceiver 902 to be the same, based on a first channel response indicating that the first calibration signal is received by the second transceiver 902, a second channel response indicating that the first calibration signal is received by the first transceiver 901, a third channel response indicating that the second calibration signal is received by the first transceiver 901, and a fourth channel response indicating that the second calibration signal is received by the second transceiver 902; obtain a first phase difference between the receive channels of the first transceiver and a second phase difference between the receive channels of the second transceiver 902 based on the uplink signal; determine a difference between the first phase difference and the second phase difference; and determine, in the candidate phase compensation coefficients based on a comparison result between the difference and a specified threshold, a phase compensation coefficient used to calibrate the phases of the transmit channels of the first transceiver 901 and the second transceiver 902 to be the same or the phases of the receive channels of the first transceiver 901 and the second transceiver 902 to be the same, where the first phase difference is obtained based on a phase difference obtained by using channel responses of the uplink signal on two receive channels of the first transceiver 901, a distance between the two receive channels, and a distance between the first transceiver 901 and the second transceiver 902, and the second phase difference is obtained based on the channel response of the uplink signal on the receive channel of the first transceiver 901 and a compensated channel response obtained after phase compensation is performed on a channel response of the uplink signal on the receive channel of the second transceiver 902 by using one candidate phase compensation coefficient; and compensate for the phases of the transmit channels and the receive channels of the first transceiver 901 and/or the second transceiver 902 based on the phase compensation coefficient.

For a specific implementation process of the operations performed by the processor 903 in the base station, refer to descriptions of the foregoing embodiments, and details are not described herein again.

The base station described in this embodiment of this application is an apparatus that is deployed in a radio access network and that is configured to provide a wireless communication function for a terminal. The base station may include a macro base station, a micro base station, a relay station, an access point, and the like in various forms. In different communications systems, names of apparatuses having a function of a base station may be different. For example, such an apparatus may be an evolved NodeB (eNB or eNodeB) in an LTE communications system, such an apparatus may be a Node B (Node B) in a 3G communications system, and such an apparatus may be a base station (BS) in a 2G communications system, or similar devices in more possible communications systems subsequently.

Based on a same technical concept, an embodiment of this application further provides an apparatus 1000, and the apparatus 1000 may implement the procedure described in the foregoing embodiments.

Figure 10:
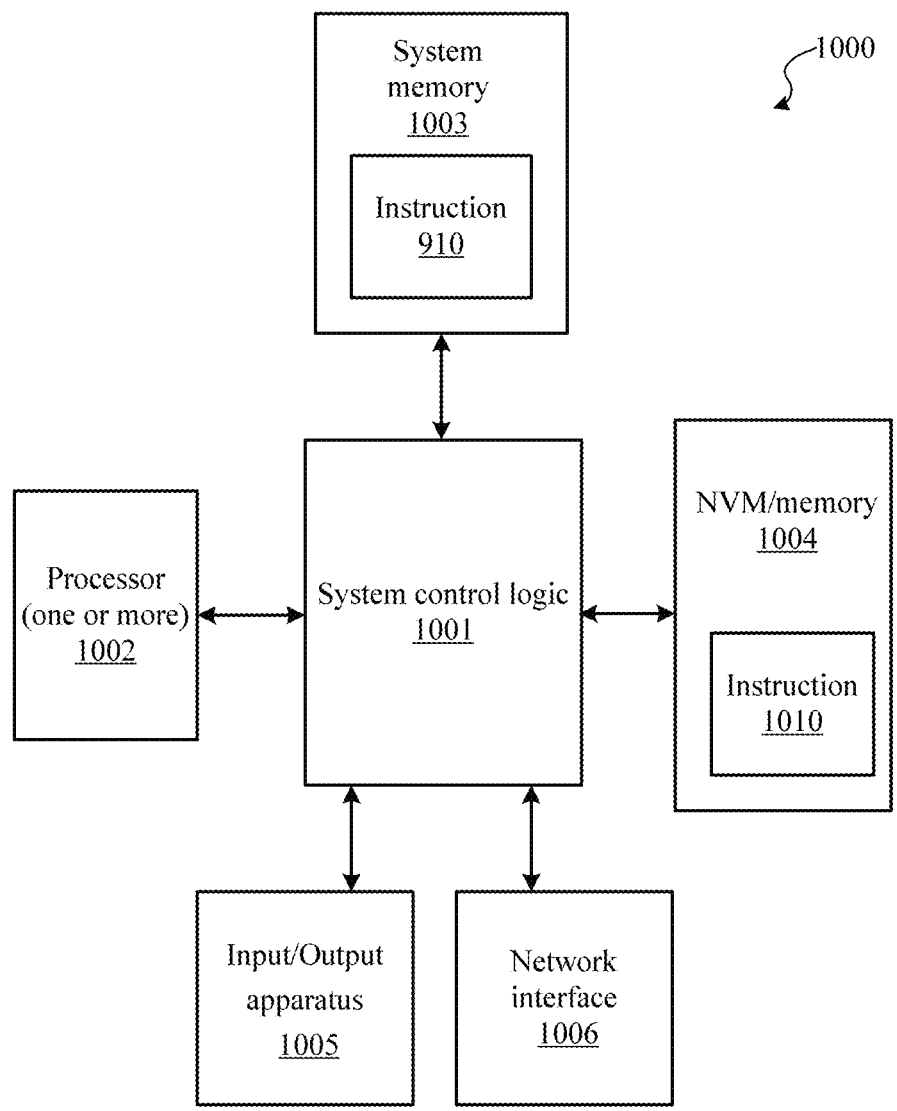
FIG. 10 is a schematic structural diagram of an apparatus according to an embodiment of this application.

FIG. 10 shows an example of an apparatus 1000 according to various embodiments. The apparatus 1000 may include one or more processors 1002, system control logic 1001 coupled to at least one processor 1002, a non-volatile memory (non-volatile memory, NMV)/memory 1004 coupled to the system control logic 1001, and a network interface 1006 coupled to the system control logic 1001.

The processor 1002 may include one or more single-core or multi-core processors. The processor 1002 may include any combination of general-purpose processors or special-purpose processors (such as an image processor, an application processor, and a baseband processor).

In an embodiment, the system control logic 1001 may include any proper interface controller, to provide any proper interface to at least one of the processors 1002 and/or provide any proper interface to any proper device or component that communicates with the system control logic 1001.

In an embodiment, the system control logic 1001 may include one or more memory controllers, to provide an interface to a system memory 1003. The system memory 1003 is configured to load and store data and/or an instruction. For example, corresponding to the apparatus 1000, in an embodiment, the system memory 1003 may include any proper volatile memory.

The NVM/memory 1004 may include one or more tangible non-transitory computer-readable media, configured to store data and/or an instruction. For example, the NVM/memory 1004 may include any proper non-volatile storage apparatus, for example, one or more hard disks (hard disk device, HDD), one or more compact discs (compact disk, CD), and/or one or more digital versatile discs (digital versatile disk, DVD).

The NVM/memory 1004 may include a storage resource. The storage resource physically is a part of a device that is installed or that can be accessed in the system, but is not necessarily a part of the device. For example, the NVM/memory 1004 may be accessed by a network by using the network interface 1006.

Each of the system memory 1003 and the NVM/memory 1004 may include a copy of a temporary or persistent instruction 1010. The instruction 1010 may include an instruction that enables, when executed by at least one of the processors 1002, the apparatus 1000 to implement the method described in FIG. 3. In various embodiments, the instruction 1010, a hardware component, a firmware component, and/or a software component may additionally/alternatively be deployed in the system control logic 1001, the network interface 1006, and/or the processor 1002.

The network interface 1006 may include a receiver for providing a wireless interface to the apparatus 1000 for communicating with one or more networks and/or any proper device. The network interface 1006 may include any proper hardware and/or firmware. The network interface 1006 may include a plurality of antennas for providing a multiple-input multiple-output wireless interface. In an embodiment, the network interface 1006 may include a network adapter, a wireless network adapter, a telephone modem, and/or a wireless modem.

In an embodiment, at least one of the processors 1002 may be packaged with logic of one or more controllers used for the system control logic. In an embodiment, at least one of the processors may be packaged with logic of one or more controllers used for the system control logic, to form a system-level package. In an embodiment, at least one of the processors and logic of one or more controllers used for the system control logic may be integrated onto a same die. In an embodiment, at least one of the processors and logic of one or more controllers used for the system control logic may be integrated onto a same die, to form a system chip.

The apparatus 1000 may further include an input/output apparatus 1005. The input/output apparatus 1005 may include a user interface for enabling a user to interact with the apparatus 1000, and may include a peripheral component interface, designed to enable a peripheral component to interact with the system; and/or may include a sensor for determining an environment condition and/or location information of the apparatus 1000.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna calibration method for a base station comprising a first antenna unit and a second antenna unit, wherein phases of transmit channels of a same antenna unit are the same and phases of receive channels of the same antenna unit are the same, and a phase difference between a transmit channel and a receive channel of the first antenna unit is the same as a phase difference between a transmit channel and a receive channel of the second antenna unit, the method comprising:

sending, by the first antenna unit, a first calibration signal;
receiving, by the first antenna unit and the second antenna unit, the first calibration signal;
sending, by the second antenna unit, a second calibration signal;
receiving, by the first antenna unit and the second antenna unit, the second calibration signal;
determining, by the base station, candidate phase compensation coefficients used to calibrate the phases of the transmit channels of the first antenna unit and the second antenna unit to be the same or the phases of the receive channels of the first antenna unit and the second antenna unit to be the same, based on a first channel response indicating that the first calibration signal is received by the second antenna unit, a second channel response indicating that the first calibration signal is received by the first antenna unit, a third channel response indicating that the second calibration signal is received by the first antenna unit, and a fourth channel response indicating that the second calibration signal is received by the second antenna unit;

receiving, by the first antenna unit and the second antenna unit, an uplink signal sent by a user equipment;
obtaining, by the base station, a first phase difference between the receive channels of the first antenna unit and the second antenna unit and a second phase difference between the receive channels of the first antenna unit and the second antenna unit based on the uplink signal; determining a difference between the first phase difference and the second phase difference; determining, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same, wherein the first phase difference is obtained based on a phase difference obtained by using fifth channel responses of the uplink signal on two receive channels of the first antenna unit, a distance between the two receive channels, and a distance between the first antenna unit and the second antenna unit, and the second phase difference is obtained based on one of the fifth channel responses of the uplink signal on one of the receive channels of the first antenna unit and a compensated sixth channel response obtained after phase compensation is performed on a sixth channel response of the uplink signal on one of the receive channels of the second antenna unit by using one of the candidate phase compensation coefficients; and compensating, by the base station, for the phases of the transmit channels and the receive channels of the first antenna unit and/or the second antenna unit based on the phase compensation coefficient.

2. The method according to claim 1, wherein the determining candidate phase compensation coefficients used to calibrate the phases of the transmit channels of the first antenna unit and the second antenna unit to be the same or the phases of the receive channels of the first antenna unit and the second antenna unit to be the same comprises:

obtaining a third phase difference based on the first channel response and the fourth channel response;
obtaining a fourth phase difference based on the third channel response and the second channel response; and
determining, based on the third phase difference and the fourth phase difference, the candidate phase compensation coefficients used to calibrate the phases of the transmit channels of the first antenna unit and the second antenna unit to be the same or the phases of the receive channels of the first antenna unit and the second antenna unit to be the same.

3. The method according to claim 1, wherein the candidate phase compensation coefficients comprise a first candidate phase compensation coefficient and a second candidate phase compensation coefficient, and the second phase difference is obtained based on one of the fifth channel responses of the uplink signal on one of the receive channels of the first antenna unit and the compensated sixth channel response obtained after phase compensation is performed on the sixth channel response of the uplink signal on one of the receive channels of the second antenna unit by using the first candidate phase compensation coefficient; and the determining, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same comprises:

if the difference is less than the specified threshold, selecting the first candidate phase compensation coefficient as the phase compensation coefficient used to calibrate the phases of the transmit channels of the first antenna unit and the second antenna unit to be the same or the phases of the receive channels of the first antenna unit and the second antenna unit to be the same; otherwise, selecting the second candidate phase compensation coefficient as the phase compensation coefficient used to calibrate the phases of the transmit channels of the first antenna unit and the second antenna unit to be the same or the phases of the receive channels of the first antenna unit and the second antenna unit to be the same.

4. The method according to claim 1, wherein a process of determining the first phase difference comprises:

determining a phase difference between a second receive channel and a first receive channel of the first antenna unit based on one of the fifth channel responses of the uplink signal on the first receive channel of the first antenna unit and one of the fifth channel responses of the uplink signal on the second receive channel of the first antenna unit; and determining a phase difference between the uplink signal on a first receive channel of the second antenna unit and the uplink signal on the second receive channel of the first antenna unit as the first phase difference based on the phase difference between the uplink signal on the second receive channel of the first antenna unit and the uplink signal on the first receive channel of the first antenna unit, a distance between the first receive channel and the second receive channel of the first antenna unit, and a distance between the second receive channel of the first antenna unit and the first receive channel of the second antenna unit; and a process of determining the second phase difference comprises:

performing phase compensation on the sixth channel response of the uplink signal on the first receive channel of the second antenna unit by using one of the candidate phase compensation coefficients; and determining the phase difference between the uplink signal on the first receive channel of the second antenna unit and the uplink signal on the second receive channel of the first antenna unit as the second phase difference based on the compensated sixth channel response obtained after the phase compensation and one of the fifth channel responses of the uplink signal on the second receive channel of the first antenna unit.

5. The method according to claim 1, wherein before the obtaining the first phase difference between the receive channels of the first antenna unit and the second antenna unit and the second phase difference between the receive channels of the first antenna unit and the second antenna unit, the method further comprises:

determining, by the base station, whether the uplink signal is a line-of-sight transmission signal; and the obtaining the first phase difference between the receive channels of the first antenna unit and the second antenna unit and the second phase difference between the receive channels of the first antenna unit and the second antenna unit comprises:

if the uplink signal is a line-of-sight transmission signal, obtaining the first phase difference between the receive channels of the first antenna unit and the second antenna unit and the second phase difference between the receive channels of the first antenna unit and the second antenna unit.

6. The method according to claim 1, wherein the candidate phase compensation coefficients comprise a first candidate phase compensation coefficient and a second candidate phase compensation coefficient, and a difference between compensated phases corresponding to the first candidate phase compensation coefficient and the second candidate phase compensation coefficient is an integer multiple of 180 degrees.

7. The method according to claim 1, wherein the uplink signal is a sounding reference signal.

8. The method according to claim 1, wherein the first antenna unit and the second antenna unit are vertically or horizontally arranged.

9. An antenna calibration apparatus for a base station comprising a first antenna unit and a second antenna unit, wherein phases of transmit channels of a same antenna unit are the same and phases of receive channels of the same antenna unit are the same, and a phase difference between a transmit channel and a receive channel of the first antenna unit is the same as a phase difference between a transmit channel and a receive channel of the second antenna unit, the antenna calibration apparatus comprising:

a candidate phase compensation coefficient determining module, configured to determine candidate phase compensation coefficients used to calibrate the phases of the transmit channels of the first antenna unit and the second antenna unit to be the same or the phases of the receive channels of the first antenna unit and the second antenna unit to be the same, based on a first channel response indicating that a first calibration signal sent by the first antenna unit is received by the second antenna unit, a second channel response indicating that the first calibration signal is received by the first antenna unit, a third channel response indicating that a second calibration signal sent by the second antenna unit is received by the first antenna unit, and a fourth channel response indicating that the second calibration signal is received by the second antenna unit;

a candidate phase compensation coefficient selection module, configured to: obtain a first phase difference between the receive channels of the first antenna unit and the second antenna unit and a second phase difference between the receive channels of the first antenna unit and the second antenna unit based on an uplink signal that is sent by user equipment and that is received by the first antenna unit and the second antenna unit; determine a difference between the first phase difference and the second phase difference; and determine, in the candidate phase compensation coefficients based on a comparison result between the difference and a specified threshold, a phase compensation coefficient used to calibrate the phases of the transmit channels of the first antenna unit and the second antenna unit to be the same or the phases of the receive channels of the first antenna unit and the second antenna unit to be the same, wherein the first phase difference is obtained based on a phase difference obtained by using fifth channel responses of the uplink signal on two receive channels of the first antenna unit, a distance between the two receive channels, and a distance between the first antenna unit and the second antenna unit, and the second phase difference is obtained based on one of the fifth channel responses of the uplink signal on one of the receive channels of the first antenna unit and a compensated sixth channel response obtained after phase compensation is performed on a sixth channel response of the uplink signal on one of the receive channels of the second antenna unit by using one of the candidate phase compensation coefficients; and a phase compensation module, configured to compensate for the phases of the transmit channels and the receive channels of the first antenna unit and/or the second antenna unit based on the phase compensation coefficient.

10. The apparatus according to claim 9, wherein the candidate phase compensation coefficient selection module is further configured to:
obtain a third phase difference based on the first channel response and the fourth channel response;
obtain a fourth phase difference based on the third channel response and the second channel response; and
determine, based on the third phase difference and the fourth phase difference, the candidate phase compensation coefficients used to calibrate the phases of the transmit channels of the first antenna unit and the second antenna unit to be the same or the phases of the receive channels of the first antenna unit and the second antenna unit to be the same.

11. The apparatus according to claim 9, wherein the candidate phase compensation coefficients comprise a first candidate phase compensation coefficient and a second candidate phase compensation coefficient, and the second phase difference is obtained based one of the fifth channel responses of the uplink signal on one of the receive channels of the first antenna unit and the compensated sixth channel response obtained after phase compensation is performed on the sixth channel response of the uplink signal on one of the receive channels of the second antenna unit by using the first candidate phase compensation coefficient; and the candidate phase compensation coefficient selection module is further configured to:
if the difference is less than the specified threshold, select the first candidate phase compensation coefficient as the phase compensation coefficient used to calibrate the phases of the transmit channels of the first antenna unit and the second antenna unit to be the same or the phases of the receive channels of the first antenna unit and the second antenna unit to be the same; otherwise, select the second candidate phase compensation coefficient as the phase compensation coefficient used to calibrate the phases of the transmit channels of the first antenna unit and the second antenna unit to be the same or the phases of the receive channels of the first antenna unit and the second antenna unit to be the same.

12. The apparatus according to claim 9, wherein the candidate phase compensation coefficient selection module is further configured to:
determine a phase difference between a second receive channel and a first receive channel of the first antenna unit based on one of the fifth channel responses of the uplink signal on the first receive channel of the first antenna unit and one of the fifth channel responses of the uplink signal on the second receive channel of the first antenna unit; and determine a phase difference between the uplink signal on a first receive channel of the second antenna unit and the uplink signal on the second receive channel of the first antenna unit as the first phase difference based on the phase difference between the uplink signal on the second receive channel of the first antenna unit and the uplink signal on the first receive channel of the first antenna unit, a distance between the first receive channel and the second receive channel of the first antenna unit, and a distance between the second receive channel of the first antenna unit and the first receive channel of the second antenna unit; and perform phase compensation on the sixth channel response of the uplink signal on the first receive channel of the second antenna unit by using one of the candidate phase compensation coefficients; and determine the phase difference between the uplink signal on the first receive channel of the second antenna unit and the uplink signal on the second receive channel of the first antenna unit as the second phase difference based on the compensated sixth channel response obtained after the phase compensation and one of the fifth channel responses of the uplink signal on the second receive channel of the first antenna unit.

13. The apparatus according to claim 9, wherein the candidate phase compensation coefficient selection module is further configured to:
before obtaining the first phase difference between the receive channels of the first antenna unit and the second antenna unit and the second phase difference between the receive channels of the first antenna unit and the second antenna unit, determine whether the uplink signal is a line-of-sight transmission signal; and
if the uplink signal is a line-of-sight transmission signal, obtain the first phase difference between the receive channels of the first antenna unit and the second antenna unit and the second phase difference between the receive channels of the first antenna unit and the second antenna unit.

14. The apparatus according to claim 9, wherein the candidate phase compensation coefficients comprise a first candidate phase compensation coefficient and a second candidate phase compensation coefficient, and a difference between compensated phases corresponding to the first candidate phase compensation coefficient and the second candidate phase compensation coefficient is an integer multiple of 180 degrees.

15. The apparatus according to claim 9, wherein the uplink signal is a sounding reference signal.

16. The apparatus according to claim 9, wherein the first antenna unit and the second antenna unit are vertically or horizontally arranged.

17. A base station, comprising a first transceiver, a second transceiver, and a processor, wherein
the first transceiver is configured to: send a first calibration signal, receive the first calibration signal and a second calibration signal sent by the second transceiver, and receive an uplink signal sent by user equipment;
the second transceiver is configured to: send the second calibration signal, receive the second calibration signal and the first calibration signal sent by the first transceiver, and receive the uplink signal sent by the user equipment; and
the processor is configured to:
determine candidate phase compensation coefficients used to calibrate phases of transmit channels of the first transceiver and the second transceiver to be the same or phases of receive channels of the first transceiver and the second transceiver to be the same, based on a first channel response indicating that the first calibration signal is received by the second transceiver, a second channel response indicating that the first calibration signal is received by the first transceiver, a third channel response indicating that the second calibration signal is received by the first transceiver, and a fourth channel response indicating that the second calibration signal is received by the second transceiver;

obtain a first phase difference between the receive channels of the first transceiver and the second transceiver and a second phase difference between the receive channels of the first transceiver and the second transceiver based on the uplink signal; determine a difference between the first phase difference and the second phase difference; and determine, in the candidate phase compensation coefficients based on a comparison result between the difference and a specified threshold, a phase compensation coefficient used to calibrate the phases of the transmit channels of the first transceiver and the second transceiver to be the same or the phases of the receive channels of the first transceiver and the second transceiver to be the same, wherein the first phase difference is obtained based on a phase difference obtained by using fifth channel responses of the uplink signal on two receive channels of the first transceiver, a distance between the two receive channels, and a distance between the first transceiver and the second transceiver, and the second phase difference is obtained based on one of the channel responses of the uplink signal on one the receive channels of the first antenna unit and a compensated sixth channel response obtained after phase compensation is performed on a sixth channel response of the uplink signal on one of the receive channels of the second antenna unit by using one of the candidate phase compensation coefficients; and compensate for the phases of the transmit channels and the receive channels of the first transceiver and/or the second transceiver based on the phase compensation coefficient.

18. The base station according to claim 17, wherein the processor is further configured to:
obtain a third phase difference based on the first channel response and the fourth channel response;
obtain a fourth phase difference based on the third channel response and the second channel response; and
determine, based on the third phase difference and the fourth phase difference, the candidate phase compensation coefficients used to calibrate the phases of the transmit channels of the first antenna unit and the second antenna unit to be the same or the phases of the receive channels of the first antenna unit and the second antenna unit to be the same.

19. The base station according to claim 17,
wherein the candidate phase compensation coefficients comprise a first candidate phase compensation coefficient and a second candidate phase compensation coefficient, and the second phase difference is obtained based on one of the fifth channel responses of the uplink signal on one of the receive channels of the first antenna unit and the compensated sixth channel response obtained after phase compensation is performed on the sixth channel response of the uplink signal on one of the receive channels of the second antenna unit by using the first candidate phase compensation coefficient; and the processor is further configured to:
if the difference is less than the specified threshold, select the first candidate phase compensation coefficient as the phase compensation coefficient used to calibrate the phases of the transmit channels of the first antenna unit and the second antenna unit to be the same or the phases of the receive channels of the first antenna unit and the second antenna unit to be the same; otherwise, select the second candidate phase compensation coefficient as the phase compensation coefficient used to calibrate the phases of the transmit channels of the first antenna unit and the second antenna unit to be the same or the phases of the receive channels of the first antenna unit and the second antenna unit to be the same.

20. The base station according to claim 17, wherein the processor is further configured to:
determine a phase difference between a second receive channel and a first receive channel of the first antenna unit based on one of the fifth channel responses of the uplink signal on the first receive channel of the first antenna unit and one of the fifth channel responses of the uplink signal on the second receive channel of the first antenna unit; and determine a phase difference between the uplink signal on a first receive channel of the second antenna unit and the uplink signal on the second receive channel of the first antenna unit as the first phase difference based on the phase difference between the uplink signal on the second receive channel of the first antenna unit and the uplink signal on the first receive channel of the first antenna unit, a distance between the first receive channel and the second receive channel of the first antenna unit, and a distance between the second receive channel of the first antenna unit and the first receive channel of the second antenna unit; and perform phase compensation on the sixth channel response of the uplink signal on the first receive channel of the second antenna unit by using one of the candidate phase compensation coefficients; and determine the phase difference between the uplink signal on the first receive channel of the second antenna unit and the uplink signal on the second receive channel of the first antenna unit as the second phase difference based on the compensated sixth channel response obtained after the phase compensation and one of the fifth channel responses of the uplink signal on the second receive channel of the first antenna unit.

* * * * *

UNITED STATES PATENT AND TRADEMARK OFFICE
CERTIFICATE OF CORRECTION

PATENT NO. : 10,812,159 B2
APPLICATION NO. : 16/519352
DATED : October 20, 2020
INVENTOR(S) : Jiesheng Huang et al.

Page 1 of 1

It is certified that error appears in the above-identified patent and that said Letters Patent is hereby corrected as shown below:

In the Claims

In Claim 11, Column 27, Line 36, delete "obtained based one" and insert --obtained based on one--.

In Claim 17, Column 29, Line 32, delete "one of the channel responses" and insert --one of the fifth channel responses--.

In Claim 17, Column 29, Line 33, delete "on one the receive" and insert --on one of the receive--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*